United States Patent
Özden et al.

(10) Patent No.: US 12,012,800 B2
(45) Date of Patent: Jun. 18, 2024

(54) APERTURE COVER WITH OVERLAPPING VIG UNIT AND CONNECTION PROFILE CONNECTED TO STRUCTURAL FRAME MEMBER

(71) Applicant: VKR HOLDING A/S, Hørsholm (DK)

(72) Inventors: Utku Ahmet Özden, Hørsholm (DK); Jacob Christian Molbo, Hørsholm (DK); Jens Troels Plesner Kristensen, Hørsholm (DK); Søren Vejling Andersen, Hørsholm (DK); Peter Jean Claude Gadgaard Tønning, Hørsholm (DK); Simon Johnsen, Hørsholm (DK)

(73) Assignee: VKR HOLDING A/S, Horsholm (DK)

( * ) Notice: Subject to any disclaimer, the term of this patent is extended or adjusted under 35 U.S.C. 154(b) by 319 days.

(21) Appl. No.: 17/422,545

(22) PCT Filed: Jan. 13, 2020

(86) PCT No.: PCT/DK2020/050016
§ 371 (c)(1),
(2) Date: Jul. 13, 2021

(87) PCT Pub. No.: WO2020/147907
PCT Pub. Date: Jul. 23, 2020

(65) Prior Publication Data
US 2022/0106794 A1    Apr. 7, 2022

(30) Foreign Application Priority Data

Jan. 14, 2019  (DK) .............................. PA201970020
Jan. 14, 2019  (DK) .............................. PA201970021
(Continued)

(51) Int. Cl.
*E06B 3/66*    (2006.01)
*E04D 13/03*   (2006.01)
(Continued)

(52) U.S. Cl.
CPC ........ *E06B 3/6612* (2013.01); *E04D 13/0315* (2013.01); *E04D 13/0354* (2013.01);
(Continued)

(58) Field of Classification Search
CPC ........ E06B 3/6612; E06B 3/5481; E06B 3/56; E06B 3/677; E06B 2003/6208;
(Continued)

(56) References Cited

U.S. PATENT DOCUMENTS 2,595,927 A    5/1952   Chapin
2,781,561 A    2/1957   Gifford
(Continued)

FOREIGN PATENT DOCUMENTS

CN         2835403 Y      11/2006
CN       106760122 A       5/2017
(Continued)

OTHER PUBLICATIONS

International Search Report for corresponding application PCT/DK2020/050008 filed Jan. 13, 2020; dated Apr. 3, 2020.
(Continued)

*Primary Examiner* — Andrew J Triggs
(74) *Attorney, Agent, or Firm* — CANTOR COLBURN LLP

(57) ABSTRACT

The present disclosure relates to an aperture cover such as a window or a door. The aperture cover comprises a vacuum insulated glass unit (3), and a frame (2, 17) such as a sash. The frame (2, 17) comprises elongated structural frame members (8) which together encloses a frame opening (2a). The vacuum insulated glass unit (3) overlaps (18) at least one of the elongated structural frame members (8) so that the edge surface (7) of the vacuum insulated glass unit (3) extends beyond the outer side surface (14) of the overlapped elongated structural frame member (8). The frame (2) more-
(Continued)

Figure 1:
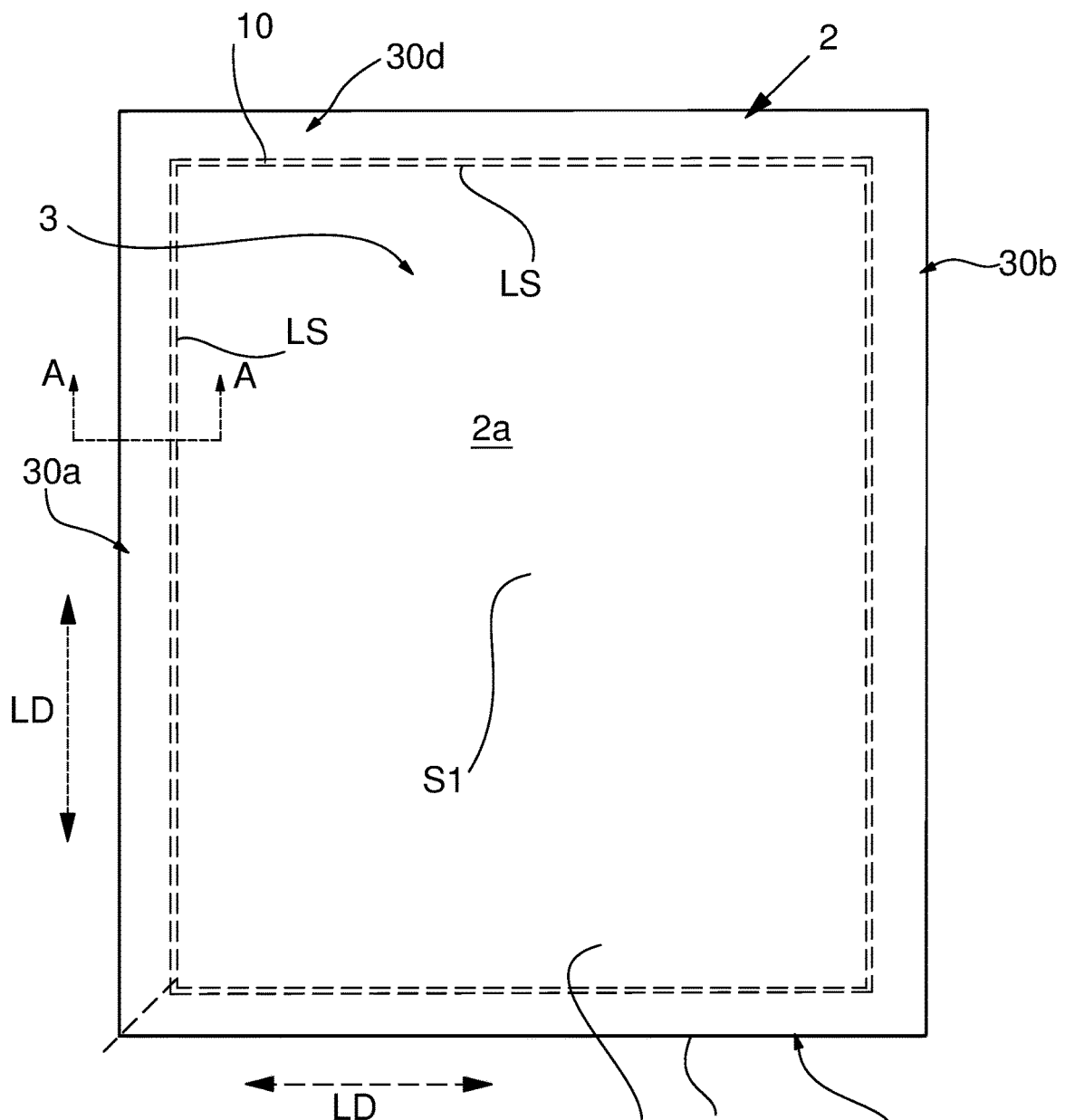

over comprises an elongated connection profile (6) comprising a connection wall member (6a) which extends parallel to the overlapped structural frame member (8) and is connected to at least one of the outer major surfaces (S1, S2) of the vacuum insulated glass unit (3), and the elongated connection profile (6) comprises a fixation member (6b) which is connected to the overlapped structural frame member (8).

18 Claims, 12 Drawing Sheets

(30) Foreign Application Priority Data

| Jan. 14, 2019 | (DK) | .............................. PA201970022 |
|---|---|---|
| Jan. 14, 2019 | (DK) | .............................. PA201970023 |
| Jan. 14, 2019 | (DK) | .............................. PA201970024 |
| Jan. 14, 2019 | (DK) | .............................. PA201970025 |
| Jan. 14, 2019 | (DK) | .............................. PA201970026 |

(51) Int. Cl.

| *E04D 13/035* | (2006.01) |
|---|---|
| *E06B 3/02* | (2006.01) |
| *E06B 3/14* | (2006.01) |
| *E06B 3/54* | (2006.01) |
| *E06B 3/56* | (2006.01) |
| *E06B 3/62* | (2006.01) |
| *E06B 3/677* | (2006.01) |
| *E06B 7/23* | (2006.01) |

(52) U.S. Cl.
CPC ............... *E06B 3/025* (2013.01); *E06B 3/14* (2013.01); *E06B 3/5427* (2013.01); *E06B 3/5454* (2013.01); *E06B 3/5481* (2013.01); *E06B 3/56* (2013.01); *E06B 3/62* (2013.01); *E06B 3/6621* (2013.01); *E06B 3/677* (2013.01); *E06B 7/2301* (2013.01); *E06B 7/2305* (2013.01); *E06B 2003/6208* (2013.01); *E06B 2003/6229* (2013.01); *E06B 2003/6238* (2013.01); *E06B 2003/6291* (2013.01); *Y02A 30/249* (2018.01); *Y02B 80/22* (2013.01)

(58) Field of Classification Search
CPC .......... E06B 3/025; E06B 3/14; E06B 3/5427; E06B 3/5454; E06B 3/62; E06B 3/6621; E06B 7/2301; E06B 7/2305; E06B 2003/6229; E06B 2003/6238; E06B 2003/6291; E04D 13/0315; E04D 13/0354; Y02A 30/249; Y02B 80/22
See application file for complete search history.

(56) References Cited

U.S. PATENT DOCUMENTS

| 3,686,795 | A | 8/1972 | La Barge | |
|---|---|---|---|---|
| 3,861,085 | A | 1/1975 | Jacob | |
| 4,134,234 | A | 1/1979 | Auger | |
| 4,134,238 | A | 1/1979 | Auger | |
| 5,216,855 | A | 6/1993 | Richter | |
| 5,373,672 | A | 12/1994 | Schulz | |
| 6,263,623 | B1 | 7/2001 | Weiss | |
| 6,295,774 | B1* | 10/2001 | Lindgren | ............... E04D 13/031 52/204.1 |
| 6,435,360 | B1 | 8/2002 | Anin | |
| 9,447,627 | B2 | 9/2016 | Thompson | |
| 10,280,680 | B2* | 5/2019 | Veerasamy | ......... E06B 3/66304 |
| 11,767,704 | B2* | 9/2023 | Özden | ...................... E06B 3/54 52/200 |
| 2007/0032972 | A1 | 2/2007 | Glover | |
| 2009/0324858 | A1* | 12/2009 | Jaeger | |
| 2010/0162643 | A1* | 7/2010 | Blomberg | ........... E04D 13/0315 52/200 |
| 2012/0028027 | A1* | 2/2012 | Hortrich | ................. E06B 3/263 264/250 |
| 2012/0137607 | A1 | 6/2012 | Kristensen | |
| 2013/0101759 | A1 | 4/2013 | Jones | |
| 2014/0007396 | A1 | 1/2014 | Jones | |
| 2014/0069034 | A1 | 3/2014 | Jones | |
| 2015/0345207 | A1 | 12/2015 | Thompson | |
| 2016/0265265 | A1* | 9/2016 | Merlo | ................. E06B 3/66342 |
| 2017/0002599 | A1 | 1/2017 | Thompson | |
| 2019/0063146 | A1* | 2/2019 | Freese | ........................ E06B 7/10 |
| 2022/0090437 | A1* | 3/2022 | Özden | ....................... E06B 3/56 |

FOREIGN PATENT DOCUMENTS

| DE | 3202639 A1 | 8/1983 |
|---|---|---|
| DE | 102006020455 A1 | 6/2007 |
| DE | 202009016113 U1 | 5/2011 |
| DE | 10201400186 A1 | 2/2016 |
| EP | 0418461 A1 | 3/1991 |
| EP | 0421239 A2 | 4/1991 |
| EP | 0472109 A2 | 2/1992 |
| EP | 1298100 A1 | 4/2003 |
| EP | 1908914 A1 | 4/2008 |
| EP | 2169172 A2 | 3/2010 |
| EP | 2921632 A1 | 9/2015 |
| EP | 3101195 A1 | 12/2016 |
| EP | 3124733 A1 | 2/2017 |
| EP | 3170799 A1 | 5/2017 |
| FR | 2514057 A1 | 4/1983 |
| FR | 2823789 A1 | 10/2002 |
| FR | 2942843 A1 | 9/2010 |
| GB | 2492380 A | 1/2013 |
| GB | 2521419 A | 6/2015 |
| JP | 2000064732 A | 2/2000 |
| JP | 2001146881 A | 5/2001 |
| JP | 2002021437 A | 1/2002 |
| JP | 2007132637 A | 5/2007 |
| KR | 20180128659 A | 12/2018 |
| WO | 2014039642 A1 | 3/2014 |
| WO | 2014183606 A1 | 11/2014 |
| WO | 2015183863 A1 | 12/2015 |
| WO | 2017210701 A1 | 12/2017 |

OTHER PUBLICATIONS

International Search Report for corresponding application PCT/DK2020/050009 filed Jan. 13, 2020; dated Mar. 30, 2020.
International Search Report for corresponding application PCT/DK2020/050010 filed Jan. 13, 2020; dated Mar. 25, 2020.
International Search Report for corresponding application PCT/DK2020/050011 filed Jan. 13, 2020; dated Apr. 7, 2020.
International Search Report for corresponding application PCT/DK2020/050012 filed Jan. 13, 2020; dated Apr. 9, 2020.
International Search Report for corresponding application PCT/DK2020/050013 filed Jan. 13, 2020; dated Mar. 19, 2020.
International Search Report for corresponding application PCT/DK2020/050014 filed Jan. 13, 2020; dated Apr. 14, 2020.
International Search Report for corresponding application PCT/DK2020/050015 filed Jan. 13, 2020; Report dated Mar. 27, 2020.
International Search Report for corresponding application PCT/DK2020/050016 filed Jan. 13, 2020; dated Apr. 1, 2020.
International Search Report for corresponding application PCT/DK2020/050017 filed Jan. 13, 2020; dated Feb. 18, 2020.
International Search Report for corresponding application PCT/DK2020/050018 filed Jan. 13, 2020; dated Feb. 18, 2020.
Written Opinion for corresponding application PCT/DK2020/050008 filed Jan. 13, 2020; dated Apr. 3, 2020.
Written Opinion for corresponding application PCT/DK2020/050009 filed Jan. 13, 2020; dated Mar. 30, 2020.
Written Opinion for corresponding application PCT/DK2020/050010 filed Jan. 13, 2020; dated Mar. 25, 2020.
Written Opinion for corresponding application PCT/DK2020/050011 filed Jan. 13, 2020; dated Apr. 7, 2020.

(56) References Cited

OTHER PUBLICATIONS

Written Opinion for corresponding application PCT/DK2020/050012 filed Jan. 13, 2020; dated Apr. 9, 2020.
Written Opinion for corresponding application PCT/DK2020/050013 filed Jan. 13, 2020; dated Mar. 19, 2020.
Written Opinion for corresponding application PCT/DK2020/050014 filed Jan. 13, 2020; dated Apr. 14, 2020.
Written Opinion for corresponding application PCT/DK2020/050015 filed Jan. 13, 2020; Report dated Mar. 27, 2020.
Written Opinion for corresponding application PCT/DK2020/050016 filed Jan. 13, 2020; dated Apr. 1, 2020.
Written Opinion for corresponding application PCT/DK2020/050017 filed Jan. 13, 2020; dated Feb. 18, 2020.
Written Opinion for corresponding application PCT/DK2020/050018 filed Jan. 13, 2020; dated Feb. 18, 2020.

* cited by examiner

APERTURE COVER WITH OVERLAPPING VIG UNIT AND CONNECTION PROFILE CONNECTED TO STRUCTURAL FRAME MEMBER

The present disclosure relates to an aperture cover such as a window or a door, a building aperture cover arrangement and a building comprising one or more building aperture cover arrangements.

BACKGROUND

Vacuum insulated glass (VIG) units provides several advantages such as good heat insulation properties and reduced thickness. A VIG unit may typically comprise glass sheets kept separated by support structures arranged in an airtight and evacuated gap between the glass sheets. To provide an airtight gap, an edge sealing is applied along the glass sheet edges so as to enclose the gap between the glass sheets. This edge seal may be made from e.g. a glass frit material such as low melting point glass frit material which is applied along the edges of a glass sheet and then subsequently heated in order to melt the glass material to provide an airtight and strong edge sealing.

Patent document U.S. Pat. No. 9,447,627B2 discloses a window frame unit for vacuum insulated glass unit. A base member and a glazing member of a frame provides a recess wherein a distal edge of a VIG unit is arranged. The recess is disclosed to be designed to accommodate distortion of the VIG unit rather than constraining the VIG unit at the distal edge of the VIG unit. This is obtained by a resilient, flexible tab of a glazing member that is/are snapped into engagement with a base member of the frame, so that the tabs may allow the glazing member to pivot to accommodate distortion of the VIG unit. Patent documents U.S. Pat. No. 6,435,630 B1 and JP2007132637 discloses other solutions for holding a VIG unit. Patent document EP2169172 B1 discloses a further solution where a frame holds a VIG unit by means of an adhesive at a surface facing a sash. US2012137607 discloses a window frame and a possible VIG where the pane is moulded in an element.

It however appears that problems still exists when arranging a VIG unit in a frame to provide for example a window or door for e.g. covering building apertures.

The present disclosure provides one or more solutions where a VIG unit is arranged in a frame, which may e.g. help to improve or ensure the lifetime, such as the estimated lifetime, of the VIG unit, provide a more simple mechanical solution for holding a VIG unit in/at a frame, provide a solution that may be used under varying climatic conditions, and/or provide a solution which is advantageous from a manufacturing point of view and which may enable a space saving solution.

SUMMARY

VIG units are normally made from glass sheets kept separated by support structures such as pillars arranged in an airtight and evacuated gap between the glass sheets. To provide the airtight gap, an edge sealing is provided along the glass sheet edges so as to enclose the gap between the glass sheets. This edge seal may be made from e.g. a glass frit material such as low melting point glass frit material which is applied along the edges of a glass sheet and then subsequently heated in order to melt the glass material to provide an airtight and strong edge sealing. The edge seal may alternatively be made from a metal seal which is heated to a melting point and then cooled to cure.

The gap(s) between the glass sheets are normally evacuated by means of an evacuation cup connected to an evacuation pump, and the evacuation cup is arranged to cover an evacuation hole in one of the glass sheets for the VIG unit, which is then sealed after the evacuation of the gap. Alternatively, the gap may be evacuated in an evacuation chamber enclosing the entire VIG unit. The gap is normally evacuated to below $10^{-3}$ bar, such as below $10^{-4}$ bar, e.g. to about or below $10^{-3}$ mbar.

The VIG unit is subjected to significant temperature differences $\Delta T$ between the VIG unit glass sheets due to the good insulation capabilities of the VIG unit. As the edge seal for sealing the gap between the VIG unit glass sheets is normally very stiff in nature, the temperature difference $\Delta T$ between the glass sheets causes the VIG unit to deflect (also known as thermal bending, thermal deflection or thermal distortion), as the hotter glass sheet of the VIG unit will expand compared to the colder of the glass sheets.

VIG units according to aspects of the present disclosure may in aspects of the present disclosure provide a $U_g$-value at or below 0.7 W/(m²K), such as at or below 0.6 W/(m²K), e.g. at or below 0.5 W/(m²K) such as below 0.4 W/(m²K), and such VIG units may suffer from increased thermal deflection due to the good insulation provided by means of the VIG unit. This low $U_g$-value may be obtained by means of the evacuation of the gap between the VIG glass sheets, e.g. in combination with one or more one or more of

- One or more low-e coatings such as thin tin dioxide or thin silver layers or any other suitable low e-coating layers at e.g. the inner surface(s) of the glass sheets of the VIG unit facing the VIG unit gap,
- a larger/increased support structure distance, such as above 3 or above 4 centimetres, for example above 5 centimetres, between neighbouring support structures in the VIG unit gap to reduce the number of potential "cold-bridges" provided by the support structures,
- by using support structures of a material having a low thermal conductivity and/or a small size,
- By providing a 3-layer VIG unit (i.e. with two evacuated gaps placed between a middle glass sheet and a glass sheets arranged at and parallel to opposite surfaces of the middle glass sheet),
- By providing a "floating" glass pane inside an evacuated gap, and with support structures placed at each side of the "floating" glass pane and the outer VIG unit glass sheets. (by "floating" is understood that the glass pane is not fixed to/by edge sealing material, instead the edge of the floating glass pane is placed with a gap between the edge and the edge seal part that encloses the evacuated gap between the outer two VIG glass sheets)
- By providing a hybrid VIG unit comprising a first evacuated gap between first and second glass sheets and a second gas filled gap between the second glass sheet and a further glass sheet.

It is understood that the support structures may generally be arranged in a repeated pattern such as a grid with parallel rows and columns having substantially the same distance between neighbouring support structures. In other aspects of the present disclosure, the support structures may be arranged in a pattern that has been determined/adapted based on a predetermined stress profile. This stress profile may e.g. be established by means of tests and/or computer simulations of a VIG unit. In this case, the distance between neighbouring support structures may be different at certain areas of the VIG unit across the VIG unit. For example so that there is a larger distance between some neighbouring support structures where the stress conditions are lower, and possibly a higher number of support structures where the stress conditions may be, or potentially become, higher.

The present disclosure relates to an aperture cover such as a window or a door. The aperture cover comprises a vacuum insulated glass unit comprising a first glass sheet and a second glass sheet, wherein an evacuated gap is placed between the first and second glass sheets, wherein a plurality of support structures are distributed in the evacuated gap, and wherein an edge seal encloses the evacuated gap. The vacuum insulated glass unit comprises outer major surfaces and side surfaces. The aperture cover moreover comprises a frame, wherein the frame comprises elongated structural frame members which together encloses a frame opening. The elongated structural frame members comprises an inner side surface facing the frame opening, and an opposing outer side surface. The vacuum insulated glass unit overlaps at least one of said elongated structural frame members so that the edge surface of the vacuum insulated glass unit extends beyond the outer side surface of the overlapped elongated structural frame member. The frame comprises an elongated connection profile comprising a connection wall member which extends parallel to the overlapped structural frame member and is connected to at least one of said outer major surfaces of the vacuum insulated glass unit, and the elongated connection profile comprises a fixation member which is connected to the overlapped structural frame member.

The present disclosure provides several advantages. For example, the feature that the VIG unit comprises a part that overlaps the structural frame members of the frame helps to provide an aperture cover solution which provides good insulation capabilities. The edge seal of the VIG unit, such as a fused edge seal, e.g. a solder glass or metal solder edge seal provides good strength and a wear resistant solution. However, it also provides good heat transmission which may not be desired, especially not in building aperture cover solutions. By having the VIG unit edge surface extending beyond the outer surface of the overlapped structural member, the heat transfer of e.g. cold through the edge seal to the part of the interior major surface of the VIG unit that is visible through the frame opening, is reduced significantly. Hence dew at the VIG interior, at least the visible part of the VIG interior, may be reduced significantly.

Attaching/incorporating a VIG unit into a frame may be a rather critical part of the production of a aperture cover such as a building aperture cover in order to reduce the risk of the VIG unit being damaged due to thermal deflection of the VIG unit over time and/or in order to ensure sufficient tightness of the aperture cover over time. The present disclosure may help to provide a solution that can handle thermal deflection of the VIG unit.

Also or alternatively, the present solution may enable a more space saving solution and thus enable increased inflow of light and/or an increased view through the VIG unit, and at the same time help to provide a long lasting and mechanically simple aperture cover with a VIG unit.

Moreover, the solution may provide an environmentally friendly, user friendly and cost efficient solution in case the VIG unit should need to be replaced in the frame, as the connection profile in embodiments of the present disclosure may be disconnected from the one or more overlapped structural members by disconnecting one or more fasteners, and the structural members may hence be reused by interconnecting a new VIG unit comprising a connection profile to the frame.

For example, in some aspects of the present disclosure, the connection profile may be pre-attached to the VIG unit under desired and controlled conditions remote to the installation location. Hence, the fixation interface between the VIG unit and the frame, in this case provided by the connection profile, may be attached/connected to the VIG unit in a controlled environment where it is assured that the correct environment, tool and materials are used and the result can be inspected by a sufficiently skilled personnel or automated monitoring solution.

It is advantageous in production where different glass combinations and frame combinations can be assembled efficiently with frames chosen by the customer. For example glass may have coatings optimized for keeping heat out, keeping heat in, privacy coatings etc. These can efficiently be combined with wood frames, painted frames, PVC frames etc.

In one or more aspects of the present disclosure, said connection wall member covers and is attached to a part of an outer major surface of the vacuum insulated glass unit which extends beyond the outer side surface of the overlapped structural frame member.

This provides a frame solution that provides good insulating properties, and at the same time enables a solution that can provide desirable visual appearances, such as where a larger part of the exterior surface may be exposed.

In one or more aspects of the present disclosure, said connection wall member may cover and be attached to a part of the outer major surface of the vacuum insulated glass unit which faces the overlapped structural frame member.

This provides a space saving solution where a larger part of the exterior surface of the VIG unit may be exposed. Also, it may provide an more mechanically simple solution.

In one or more aspects of the present disclosure, said connection wall member covers and is attached to a part of the outer major surface of the vacuum insulated glass unit which faces away from the overlapped structural frame member.

This provides a solution wherein a protection wall may be incorporated in the profile, and/or help to provide a solution that may reduce heat transfer through the connection profile.

In one or more aspects of the present disclosure, the connection wall member (6a) extends over a surface part (23) of a fixation frame (12).

This may help to provide a frame solution that is space saving and yet provides a good heat insulation and thus reduces the risk and/or amount of condensation of the interior surface of the VIG unit which is visible at the interior surface of the VIG unit.

In one or more aspects of the present disclosure, the connection wall member may be placed between the surface part (23) of the fixation frame (12) and the interior surface (S2) of the vacuum insulated glass unit. This may provide a space saving solution with good heat insulation performance. If the aperture cover is a window or door comprising a sash that can be opened, This may at least apply when the sash is in a closed position.

In one or more aspects of the present disclosure, the fixation member may be connected to the overlapped structural frame member from the outer side of the overlapped structural frame member. For example, in one or more aspects of the present disclosure, the fixation member may abut the opposing outer side surface of the overlapped structural frame member.

This helps to reduce heat transfer through the overlapped structural frame member. Alternatively or additionally, it may provide a solution that may be burglary resistant and at the same time may help to enable a more easy replacement of the VIG unit if needed.

In one or more aspects of the present disclosure, the elongated connection profile is a metal profile such as an aluminium profile or a steel profile.

Metal profiles provides a cost efficient reliable an strong profile solution. Additionally, metal, such as aluminium provides a good interface with bonding seals such as structural adhesives. However, the metal profile has a high thermal conduction properties, but the present disclosure provides a frame solution where this drawback can be neglected or reduced.

The metal profile comprising the connection wall member and the fixation member may in aspects of the present disclosure be an extruded or pultruded profile, such as an extruded aluminium profile.

In one or more aspects of the present disclosure, the connection member and the fixation wall member may together provide an angle bracket shape, such as substantially an L-shape, when seen in a plane which is perpendicular to the longitudinal direction of the elongated connection profile.

This may provide a simple, space saving and yet cost efficient and mechanically simple solution.

In one or more aspects of the present disclosure, the fixation member may be an elongated fixation wall which is aligned with a part of the opposing outer side surface of the overlapped structural frame member.

The fixation member may in one or more aspects of the present disclosure be releasably fixed to the elongated, structural member by means of one or a plurality of mechanical fasteners such as one or more of a snap connection, screws, nails or pop rivets.

This may e.g. help to enable a simple construction and/or enable easy assembling of the aperture cover, which may as well enable more easy exchange/replacement of the VIG unit in the frame and/or enhance recycling properties of the product.

The connection member is in one or more aspects of the present disclosure connected to the outer major surface of the vacuum insulated glass unit by means of a bonding seal. This may provide a good fixation of the VIG unit to the frame.

In one or more aspects of the present disclosure, the bonding seal may be a structural adhesive. This may provide an enhanced connection of the VIG unit to the frame.

In one or more aspects of the present disclosure, the bonding seal is a silicon adhesive, a silane-terminated polyurethane (SPUR) adhesive or a Modified-Silyl Polymer (SMP) adhesive, or a butyl adhesive.

In one or more aspects of the present disclosure the bonding seal may extend along least 50%, such as at least 70%, e.g. at least 90% such as substantially 100% of the length of the connection wall (6b), wherein said length is in the longitudinal direction (LD) of the connection profile (6). This may provide a sufficient fixation of the VIG unit to the wall of the connection profile In one or more aspects of the present disclosure the bonding seal may extends along less than 100%, such as less than 90% or less than 80%, such as at least 60%, of the length of the connection wall (6b).

This may e.g. help to reduce stress in the VIG unit when subjected to thermal deflection. For example, the bonding seal may in aspects of the present disclosure extend along between 50% and 90% or 95%, such as between 50% and 70% of the length of the connection wall. For example less or no bonding seal may be placed at and near the VIG unit corners, thereby allowing the VIG unit corners to deflect more freely and hence reduce stress conditions at the VIG unit corners.

In one or more aspects of the present disclosure, said bonding seal has a thickness above 4 mm such as above 5 mm for example above 6 mm, at a temperature difference between the two glass sheets of the vacuum insulated glass unit of substantially 0° C. For example, in one or more aspects of the present disclosure, said bonding seal may have a thickness between 4 mm and 30 mm, such as between 4 mm and 13 mm, such as between 4 mm and 10 mm, for example between 5 and 10 mm, at a temperature difference between the two glass sheets of the vacuum insulated glass unit of substantially 0° C.

Said thickness is measured in a direction perpendicular to an outer major surface of the vacuum insulated glass unit.

This may help to provide a frame solution that can cope thermal deflections of a VIG unit at the edges of the VIG unit, as the bonding seal may hence be compressed and/or stretched sufficiently when the magnitude of the thermal deflection of the VIG unit changes over time. The VIG unit edge may hence e.g. be able to provide a deflection curve, and hence partly stretch and partly compress the bonding seal along the longitudinal direction of the connection profile.

In one or more aspects of the present disclosure, the bonding seal may be placed opposite to and thus overlap the edge seal of the VIG unit.

In one or more aspects of the present disclosure, the overlapped frame member is one or more of
- an elongated structural top frame member of an elongated structural top frame arrangement,
- an elongated structural bottom frame member of an elongated structural bottom frame arrangement and/or
- an elongated structural side frame member of an elongated structural side frame arrangement.

In certain aspects of the present disclosure, the overlapped frame member is at least an elongated structural bottom frame member and structural, parallel side frame members.

In one or more advantageous aspects of the present disclosure, the aperture cover is a building aperture cover such as a window, for example a roof window. The frame solutions according to the present disclosure may be especially suitable for building aperture covers, in particular windows such as vertical windows or roof window.

In one or more advantageous aspects of the present disclosure, said frame is a sash which is movably connected to a fixation frame by means of one or more hinge connections. For example, the sash may be a top-hung sash.

The overlapping part of the VIG unit edge provides a solution that may overlap a fixation frame and hence provides a solution that may be more space saving and yet also is advantageous in order to provide a sufficient water tightening in solutions where the sash can be opened and closed.

In one or more advantageous aspects of the present disclosure, the fixation frame may comprise an outer elongated member arranged opposite to the outer side surface of the overlapped elongated structural frame member, at least when the sash is in a closed position.

For example, in aspects of the present disclosure, the part of the vacuum insulated glass unit extending beyond the outer side surface of the overlapped elongated structural frame member of the sash may moreover overlap a part of the outer elongated member of the fixation frame arranged opposite to the outer side surface of the overlapped elongated structural frame member, at least when the sash is in a closed position.

This provides a space saving solution with a good thermal insulation properties.

In one or more aspects of the present disclosure, the overlapped, structural member of the sash is placed between the vacuum insulated glass unit and an elongated further frame part of the fixation frame, at least when the sash is in a closed position.

This may for example provide an advantageous solution for handling condensation issues and also provide a solution with improved heat insulating performance of the aperture cover.

In one or more aspects of the present disclosure, the fixation member is placed between the fixation frame and the overlapped structural frame member at least when the sash is in a closed position. For example, the fixation member may be placed between the outer elongated member of the fixation frame, and the overlapped, structural member.

This may provide a solution that may be more burglary resistant and also provide/enable a more easy exchange of the VIG unit. Additionally, it may provide a solution that is advantageous from a heat insulation point of view as the fixation member is kept further away from the frame opening.

In one or more aspects of the present disclosure, one or more tightening gaskets, such as a rubber gasket, is/are placed between the fixation frame and the sash. This, these gaskets may in further aspects of the present disclosure be arranged so as to abut the overlapped structural frame member of the sash and/or the fixation frame.

In one or more aspects of the present disclosure, one or more tightening gaskets, such as a rubber gasket, an elastomer gasket or a foam gasket, may be placed between the fixation frame and the elongated connection profile when the sash is in a closed position, such as between the connection wall and the fixation frame and/or between the fixation part and the fixation frame. Providing several tightening gaskets such as two or three may enhance tightness and/or inolation performance. Also, it may help to provide an enhanced condensation water drainage solution in a space between the fixation n frame and the sash.

The gasket(s) may be softer (at the same temperature) than the bonding seal mentioned previously, and the bonding seal and the connection profile holds the VIG unit and fixes it to the structural member while the gasket improves tightness between the interior surface of the VIG unit and may also help to provide a heat insulation.

In one or more aspects of the present disclosure, the difference between the total width of the sash, and the total width of the fixation frame may be less than ±5%, such as less than ±2%, such as less than ±1% of the total width (TWfr) of the fixation frame. Also or alternatively, in one or more aspects of the present disclosure, the difference between the total height of the sash and the total height of the fixation frame may be less than ±5%, such as less than ±2%, such as less than ±1% of the total height of the fixation frame.

This may help to provide a window solution where VIG units may be placed closer together and/or help to enable a desired visual appearance such as a solution where the exterior surface of the VIG unit may be exposed.

In one or more aspects of the present disclosure, the difference between the total area of the fixation frame and the total area of the sash, respectively, is less than ±8% such as less than ±5%, such as or less than ±1% of the total area of the fixation frame, where the total area of the fixation frame is defined by the total width multiplied with the total height of the fixation frame, an where the total area of the sash is defined by the total width multiplied with the total height of the sash.

In one or more aspects of the present disclosure, the difference between the total width and/or total height of the vacuum insulated glass unit, and the total width and/or total height of the sash is less than ±5%, such as less than ±2%, such as less than ±1% of the total width and/or height of the sash.

The difference between total height and/or total width of the VIG unit and total height and/or width of the sash may in aspects of the present disclosure be between 0 and 5 cm such as between 0 and 3 cm, for example between 0 and 1 cm or between 0 and 0.5 cm.

It is generally understood that the connection profile, such as the connection wall member or the protection wall as previously described may define the outermost part(s) of the sash facing away from the frame opening, and that the total height and/or width of the sash may for example be measured between the outermost parts of two parallel elongated frame arrangements arranged along opposing parallel edge surfaces of the VIG unit such as side edges or top and bottom edges.

This may help to provide a solution with good insulative capabilities and also a solution that may enable that the edge surfaces of the VIG unit may be placed closer together in case two aperture covers are placed side by side. It may also help to provide a solution which enable desired visual appearance.

In aspects of the present disclosure, total width of the sash, and the total width of the fixation frame and/or the width of the VIG unit, may be substantially the same. Also or alternatively, in aspects of the present disclosure, the total height of the sash, the total height of the fixation frame, and/or the total height of the VIG unit may be substantially the same.

In one or more aspects of the present disclosure, the sash comprises at least the overlapped structural member and the connection profile.

The overlapped elongated structural member may in one or more aspects of the present disclosure have a maximum width at the widest part of the overlapped elongated structural member which is between 25 mm and 100 mm, such as between 30 mm and 70 mm, for example between 35 mm and 60 mm.

The maximum width may be defined at a part of the overlapped member substantially proximate to the vacuum insulated glass unit, and between the inner side surface and the opposing outer side surface, in a direction substantially parallel to a major surface of the vacuum insulated glass unit and perpendicular to the longitudinal extent of the overlapped member.

In one or more aspects of the present disclosure, said edge seal of the vacuum insulated glass unit may be a fused edge seal such as a solder material edge seal, and/or wherein the $U_g$-value of the vacuum insulted glass unit is below 0.7, such as below 0.6 or below 0.5.

For example, the edge seal may be a solder glass edge seal or a metal solder edge seal.

Especially at these low U-values ($[W/(m2)(K)]$) a thermal deflection may be induced in the VIG unit which may risk causing potentially critical stresses in the VIG unit. The solution of the present disclosure helps to provide a simple solution which may be advantageous when arranging a VIG unit having a low $U_g$-value, e.g. measured at the centre of the VIG unit, in a frame.

Generally, in one or more aspects of the present disclosure, one or more of the glass sheets of the vacuum insulated glass unit may be a tempered, such as thermally tempered glass sheet.

In one or more advantageous aspects of the present disclosure, a gasket strip, such as a resilient gasket strip, is arranged between the elongated structural member and the interior major surface.

This may help to provide a more simple mechanical solution which also helps to provide improved insulating performance and helps to prevent condensation problems at the interior surface of the VIG unit.

The gasket strip may in one or more aspects of the present disclosure be softer than the bonding seal at 20° C. The gasket strip may in one or more aspects of the present disclosure be a rubber gasket, a foam gasket or an elastomer gasket.

This may help to provide a solution with good internal sealing capabilities between the VIG unit and the frame.

In one or more aspects of the present disclosure, the gasket strip abuts the elongated structural member and the interior major surface of the vacuum insulated glass unit.

In one or more advantageous aspects of the present disclosure, the gasket strip may have a thickness of above 4 mm such as above 5 mm, for example above 6 mm at a temperature difference ($\Delta T=T1-T2$) between the two glass sheets of the VIG unit of substantially 0° C., and wherein said thickness is measured in a direction perpendicular to the interior major surface. For example, in one or more aspects of the present disclosure, the gasket strip may have a thickness between 4 mm and 30 mm, such as between 6 mm and 20 mm, for example between 5 mm and 15 mm, or such as between 9 mm and 18 mm at a temperature difference ($\Delta T-T1-T2$) between the two glass sheets (3a, 3b) of substantially 0° C., and wherein said thickness (Th2) is measured in a direction perpendicular to the interior major surface (S2).

A gasket strip of this height may be especially suitable for handing thermal deflection of the VIG unit. Preferably, the thickness of the gasket may in aspects of the present disclosure be substantially at or above 5 mm, such as above 6 or 7 mm.

In one or more advantageous aspects of the present disclosure, the resilient gasket strip is a pre-compressed or pre-deflected gasket strip. Such gasket strips may enable improved handling of the VIG unit's thermal deflection when the edge tends describes a deflection curve.

In one or more advantageous aspects of the present disclosure, the vacuum insulated glass unit is a laminated vacuum insulated glass unit comprising a further glass sheet bonded to a major surface of the vacuum insulated glass unit by means of a lamination interlayer (71).

In this case, the further glass sheet may be arranged to be an interior glass sheet arranged to face the overlapped structural member. Here, the lamination glass sheet may provide a major outer surface of the VIG unit. In other aspects, the VIG unit may be an un-laminated VIG unit.

The laminated VIG unit provides increased safety in case the VIG unit break due to e.g. outer forces striking the VIG unit.

In one or more advantageous aspects of the present disclosure, said connection profile may comprise a protection wall which extends to and covers the edge surface of the vacuum insulated glass unit, For example, in further aspects, a flexible, such as resilient, water sealing may be is placed between the protection wall and the edge surface.

This may e.g. help to provide a mechanical protection of the edge surface of the VIG unit over time and during installation, and the protection wall may also act as a further safety measure to carry the VIG unit. The optional water sealing may help to improve water tightness of the aperture cover over time and may reduce the risk of frost damages due to water entering in between protection wall and the VIG unit edge surface and/or provide a solution that may be easier to clean and keep clean as less or no foreign objects can hence enter in between the VIG unit edge surface and the protection wall. However, e.g. if the connection profile extends to the exterior surface of the VIG unit, this flexible such as resilient water sealing may be maintained or alternatively omitted.

In aspects of the present disclosure, the evacuated gap overlaps the elongated structural member with a distance.

For example, in one or more aspects of the present disclosure, the evacuated gap may overlap the elongated structural member by between 50% to 100% of the maximum width, such as between 80% to 100% of the maximum width of the overlapped structural member.

This helps to enhance the heat insulation performance of the aperture cover as heat transfer through the edge seal and into the interior frame opening may be reduced.

In certain aspects of the present disclosure, the evacuated gap may overlaps the entire width of the elongated structural member and moreover extends beyond the outer surface of the overlapped structural member.

This may provide a further enhanced heat insulation performance.

In one or more aspects of the present disclosure, the connection profile may comprise a water skirt which is configured to interface with, such as overlap, a flashing.

This helps to provide water tightness. The skirt may be especially advantageous if the aperture cover is a roof window.

In one or more aspects of the present disclosure, said frame may be configured to allow the edges of the vacuum insulated glass unit to thermally deflect in response to a temperature difference between the glass sheets of the vacuum insulated glass unit. The frame may in aspects be configured to allow the edges of the vacuum insulated glass unit are allowed to describe an edge deflection curve (DC) in response to a temperature difference between the glass sheets of the vacuum insulated glass unit.

This may help to reduce stress conditions at the edge area and/or corner areas of the VIG unit.

The present inventors have found that computer simulations revealed that in certain situations when a VIG unit is arranged in a roof window so that the major outer surfaces are not completely vertical, gravity acts on the VIG unit and may (try to) cause a further deflection of the edges of the VIG unit. This may in some situations add on to the already present thermal deflection of the VIG unit edges due to a temperature difference between the VIG units. Hence a "worse case" scenario may be if the hotter surface of the VIG unit is the interior VIG unit glass sheet surface (often a surface of a lamination glass sheet in roof windows), as both gravity and thermal deflection acts in the same deflection direction.

In one or more aspects of the present disclosure said bonding seal and/or said elongated connection profile is/are configured to allow the edges of the vacuum insulated glass unit to thermally deflect in response to a temperature difference between the glass sheets of the vacuum insulated glass unit.

In one or more aspects of the present disclosure, the largest edge deflection in a deflection direction of any of the edges of the vacuum insulated glass unit at a temperature difference between the two glass sheets of 65° C., as compared to the vacuum insulated glass unit at a temperature difference ($\Delta T$) of 0° C. may be at least 1 mm, such as in the range of 2 mm to 50 mm, preferably in the range of 1 mm, 2 mm or 3 mm to 30 mm such as to 15 mm, more preferred in the range of 2 to 10 mm. the deflection direction is here determined as perpendicular to a frame opening plane which extends parallel to the longitudinal members of the frame enclosing the frame opening.

According to aspects of the present disclosure, the largest total edge deflection of any of the edges of the vacuum insulated glass unit at a temperature difference between the two glass sheets of 65° C. as compared to the vacuum insulated glass unit at a temperature difference of 0° C. may be at least 0.3% of the length of the deflecting edge, such as in the range of 0.3% to 3.5% of the length of the deflecting edge, such as in the range of 0.4% to 2% of the length of the deflecting edge, such as in the range of 0.6% to 1.5% of the length of the deflecting edge.

According to a yet further aspect, the largest total edge deflection of any of the edges of the vacuum insulated glass unit at a to a temperature difference between the two glass sheets of 40° C. as compared to the vacuum insulated glass unit at a temperature difference of 0° C. is at least 0.15% of the length of the deflecting edge, such as in the range of 0.15% to 3% of the length of the deflecting edge, such as in the range of 0.25% to 1.8% of the length of the deflecting edge, such as in the range of 0.35% to 1.2% of the length of the deflecting edge.

The above mentioned thermal deflections may in aspects be relative to the state of the VIG unit edge position/deflection when the VIG unit glass sheets have an identical/the same temperature such as 20° C. The deflections may e.g. be occurring when the VIG unit is arranged in the frame.

In one or more aspects of the present disclosure said elongated connection profile, such as the connection wall member, may be configured to be flexed in response to a thermal deflection of the vacuum insulated glass unit caused by a temperature difference ($\Delta T$) between the glass sheets of the vacuum insulated glass unit.

The flexing of the connection profile may in aspects of the present disclosure, at one or more locations of the connection profile, be at least 1 mm, such as at least 2 mm, for example at least 4 mm in a direction perpendicular to a frame opening plane, when compared to when the vacuum insulated glass unit is subjected to a temperature difference ($\Delta T$) between the glass sheets of the VIG unit of substantially 0° C.

In one or more aspects of the present disclosure, said bonding seal is configured to be compressed and/or stretched in response to a thermal deflection of the vacuum insulated glass unit caused by a temperature difference between the glass sheets of the vacuum insulated glass unit, thereby changing the thickness of the bonding seal at one or more locations along the connection wall member when compared to the thickness at the same one or more locations when the temperature difference ($\Delta T$) is substantially 0° C.

In one or more aspects of the present disclosure, said frame is configured to partly restrict a thermal deflection of the vacuum insulated glass unit in response to a temperature difference ($\Delta T$) between the glass sheets of the vacuum insulated glass unit, when compared to a free, unrestricted thermal deflection of the vacuum insulated glass unit at substantially the same temperature difference ($\Delta T$).

This may help to provide improved and/or reduced stress conditions in the VIG unit. In one or more aspects of the present disclosure, the largest total edge deflection of the edges of the VIG unit may be configured to be at least 10% smaller, such as at least 20% smaller, such as at least 30% smaller than the largest total edge deflection of the unrestricted vacuum insulated glass (VIG) unit in a substantially mechanically unrestricted condition at a temperature difference of at least 40° C., such as about 65° C. In the unrestricted condition, it is understood that at least gravity applies on the VIG unit In one or more aspects of the present disclosure is/are configured to partly restrict a thermal deflection of the vacuum insulated glass unit in response to a temperature difference ($\Delta T$) between the glass sheets of the vacuum insulated glass unit, when compared to a free, unrestricted thermal deflection of the vacuum insulated glass unit at substantially the same temperature difference ($\Delta T$).

In one or more aspects of the present disclosure, wherein the distance from the outer edge surface of the vacuum insulated glass unit and to the location where the vacuum insulated glass unit starts to overlap the elongated structural frame member is at least 25 mm, such as at least 35 mm, such as at least 50 mm.

In one or more aspects of the present disclosure, wherein the ratio $$\frac{DIS2}{LEL}$$

between the distance DIS2 from the outer edge surface of the vacuum insulated glass unit and to the location where the vacuum insulated glass unit starts to overlap the elongated structural frame member, and the length LEL of the longest edge of the vacuum insulated glass unit 3 is above 0.015, such as above 0.017 for example above 0.018.

This may provide a VIG unit having good insulating capabilities and/or may help to reduce condensation.

A masking may be provided at the VIG unit in order to hide (or reduce the visibility) of the frame from a view through the VIG and onto the overlapped part(s) of the frame.

In one or more aspects of the present disclosure, a minimum distance between an outer major surface of the vacuum insulated glass unit and walls of said elongated structural frame members may be at least 4 mm such at least 5 mm, for example at least 6 mm at a temperature difference between the two glass sheets of the vacuum insulated glass unit of substantially 0° C. This may e.g. provide sufficient space for thermal deflection of the VG unit.

The present disclosure moreover relates to a building aperture cover arrangement comprising two or more building aperture covers. Said building aperture covers are windows such as roof windows, and the windows are arranged next to each other so that side surfaces of the vacuum insulated glass unit are arranged substantially opposite to each other. A mutual distance is provided between opposing edge surfaces of the vacuum insulated glass units of the windows arranged next to each other, wherein said mutual distance is less than 12 cm, such as less than 7 cm, such as less than 4 cm or less than 2 cm.

The window arrangement may help to provide the impression of a viewer, looking at the windows from the exterior of a building comprising the window arrangement, that the two VIG units arranged next to each other may be substantially flush. The increased glass area provides enhanced thermal performance and better protection from the elements while allowing water drain and good ventilation of the structure.

This allows advantageous installation in e.g. a building façade or in a roof where multiple windows should be arranged next to each other. Also or alternatively, This may be especially suitably in inclining roofing constructions comprising inclining rafter beams so that the frame such as the sash and/or a fixation frame may be fixed to the rafter and so that the VIG units may extend in over the rafter.

In one or more aspects of said building aperture cover arrangement, a water guidance channel may be provided below the parts of the vacuum insulated glass units which extends beyond the overlapped structural members of the respective windows.

This may help to improve water tightness and to enable a sufficient water drainage.

In one or more aspects of said building aperture cover arrangement, a space is provided between the opposing edge surfaces, wherein the water guidance channel is arranged below said space, and wherein the water guidance channel is configured to guide water entering through said space downwards due to gravity so that the water can leave the window arrangement at a bottom part of the window arrangement when the window arrangement is arranged in a building structure such as a roof structure of a building.

In one or more aspects of said building aperture cover arrangement, the largest width of the water guidance channel is at least 10% larger, such as at least 60% larger, for example at least 100% or 200% larger than the width of the space.

This may help to provide a space saving solution enabling desired visual appearances of the aperture cover arrangement, while also assuring a good water drainage also under more extreme rain conditions.

In one or more aspects of said building aperture cover arrangement, said water guidance channel comprises a bottom part, side walls and top walls, and wherein a part of the connection profiles of the windows arranged next to each other, such as the connection walls, provides or is integrated in at least a part of said top walls.

Additionally, the present disclosure relates to a building, such as a habitat building or an office building, comprising one or more building aperture covers and/or one or more building aperture cover arrangements, such as wherein said building aperture cover or building aperture covers are roof windows.

FIGURES

Figure 2:
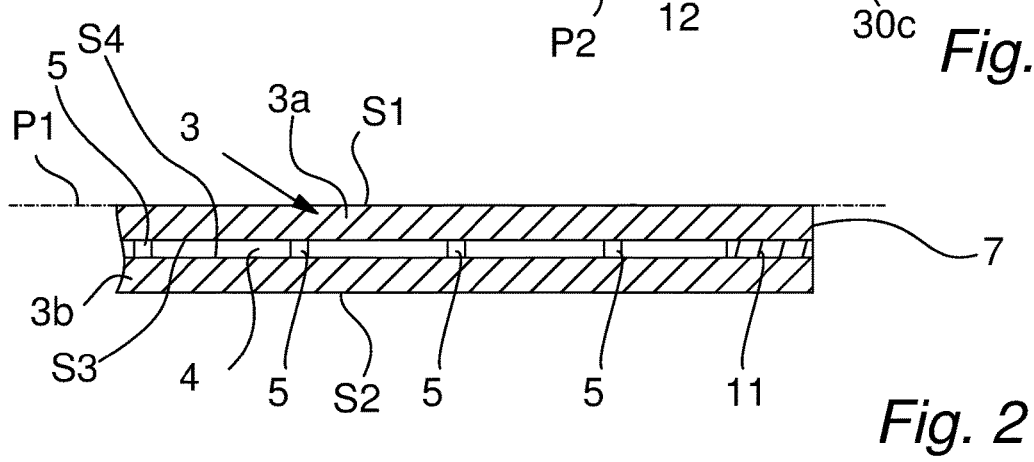
Figure 3:
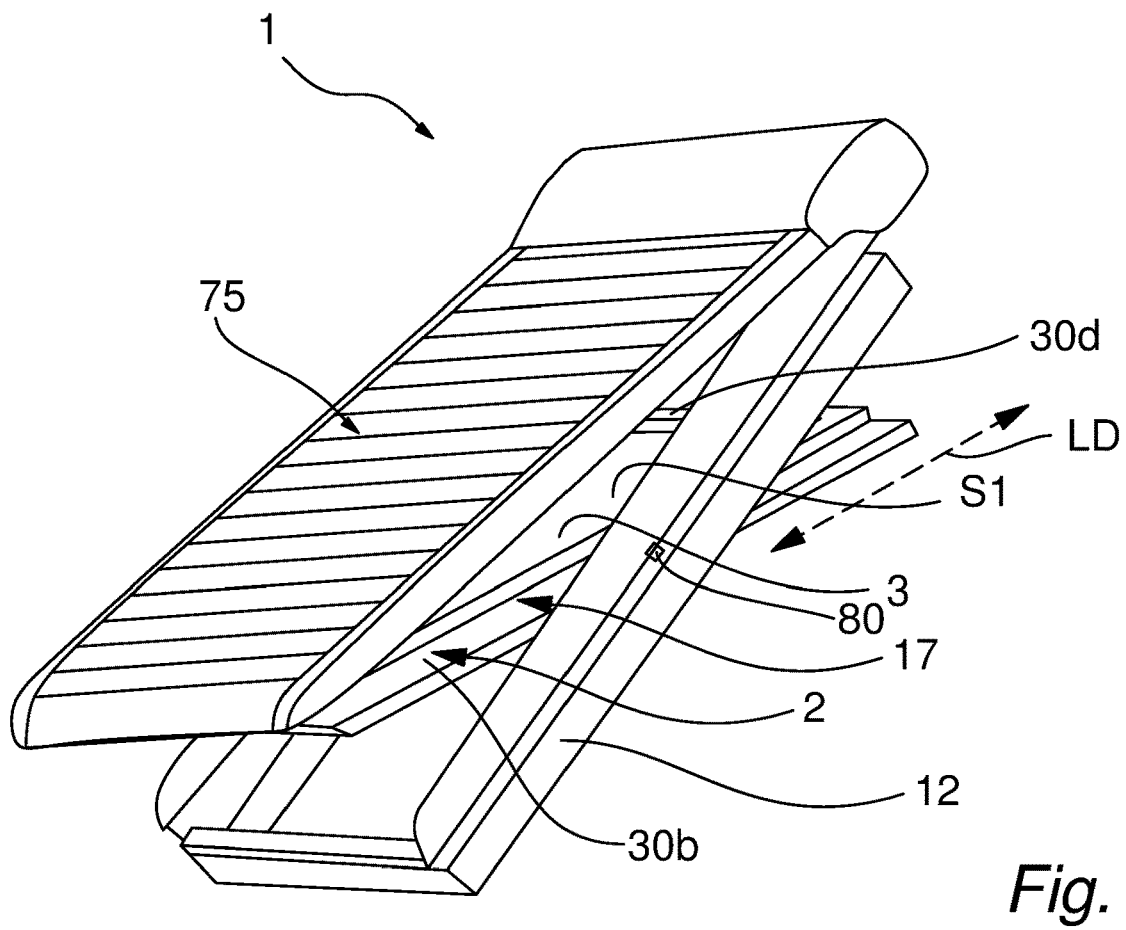
Figure 4:
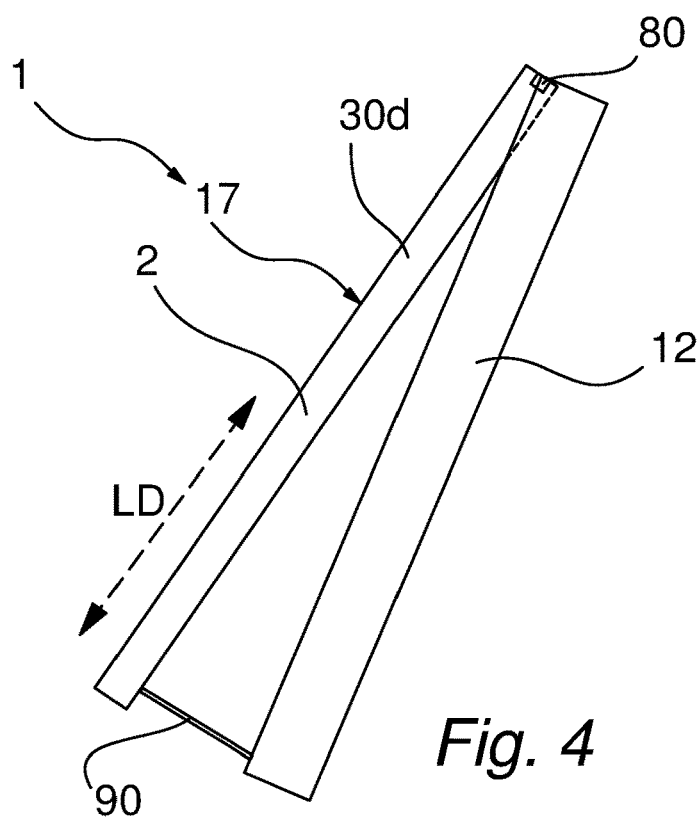
Figure 5A:
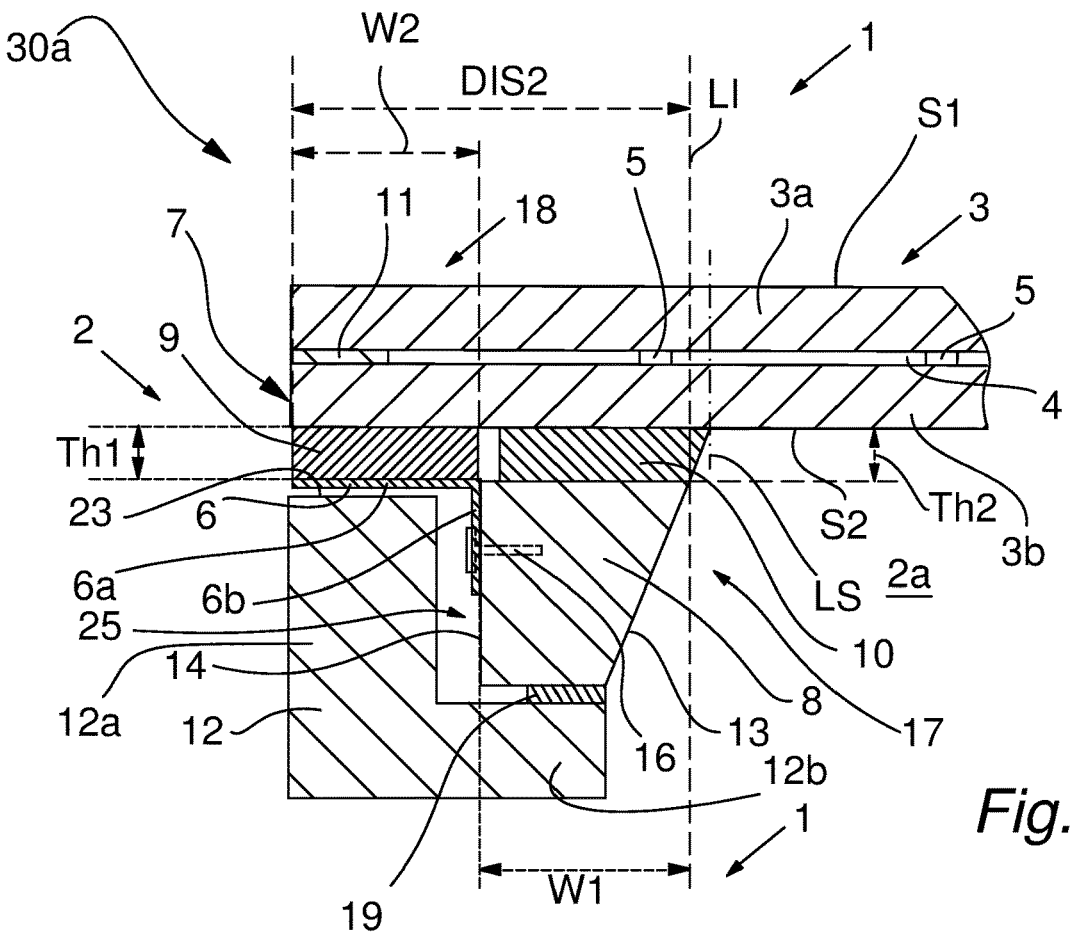
Figure 5B:
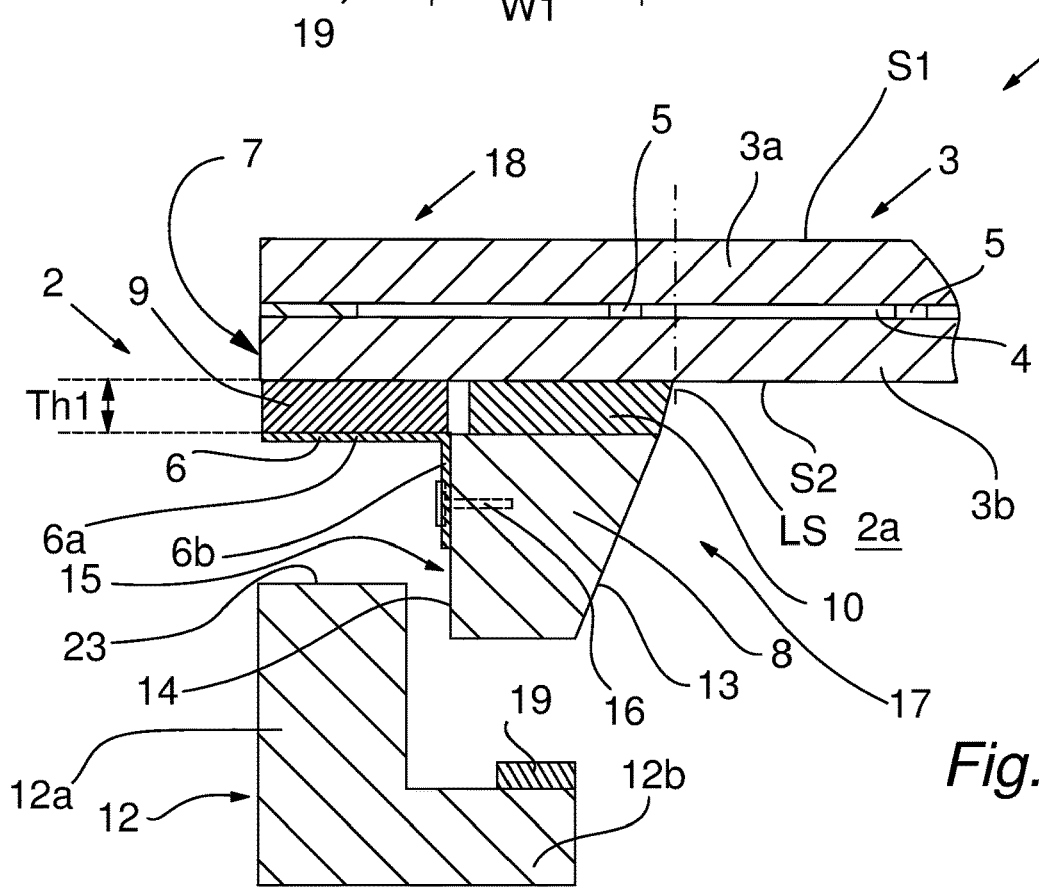
Figure 6:
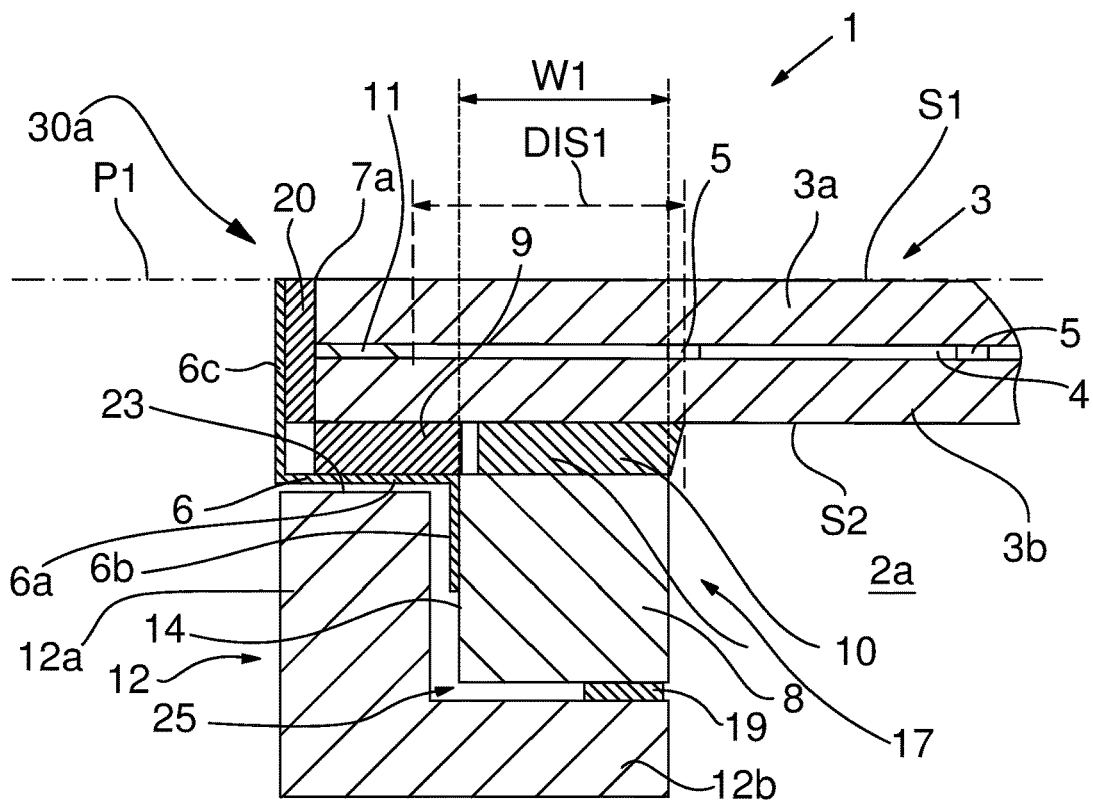
Figure 7:
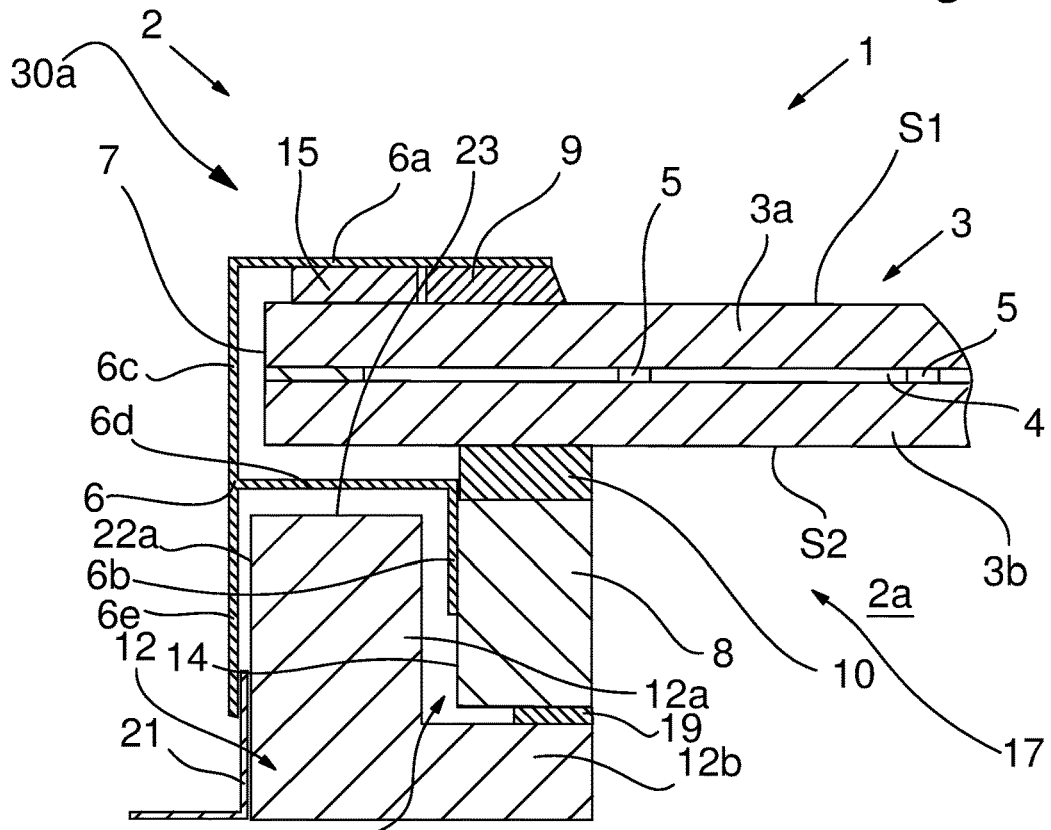
Figure 8:
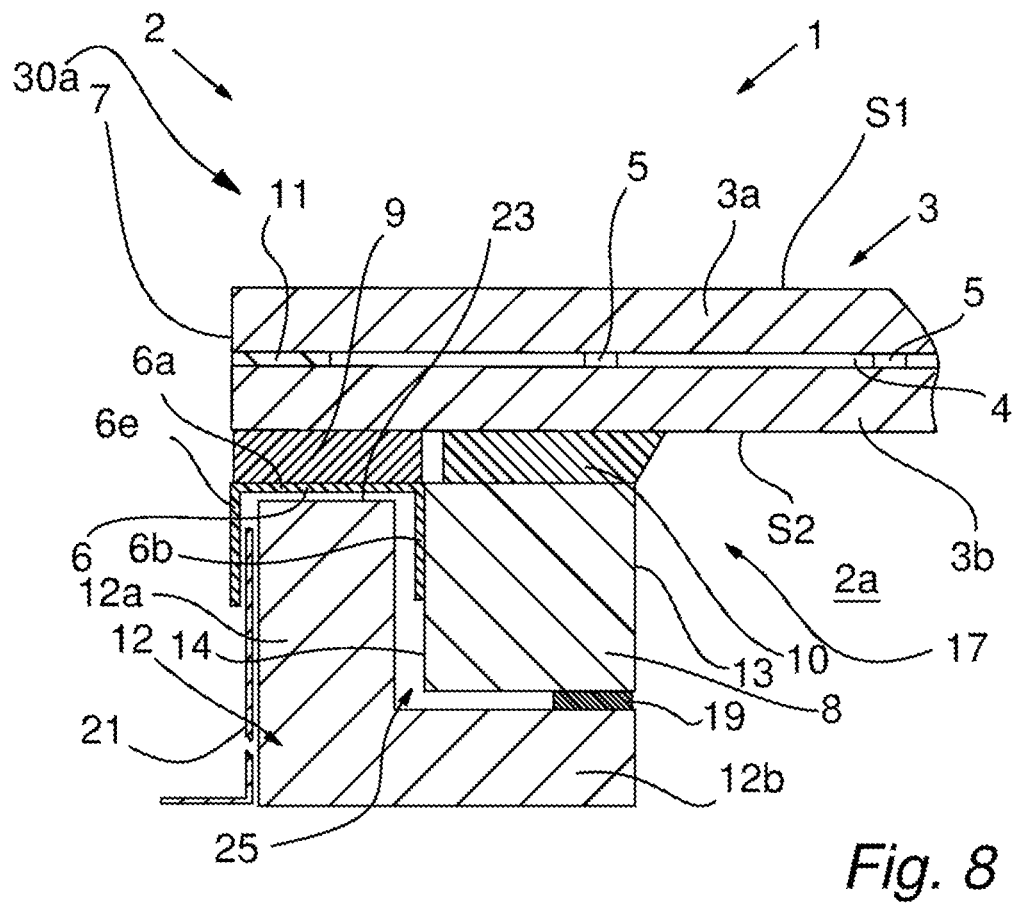
Figure 9:
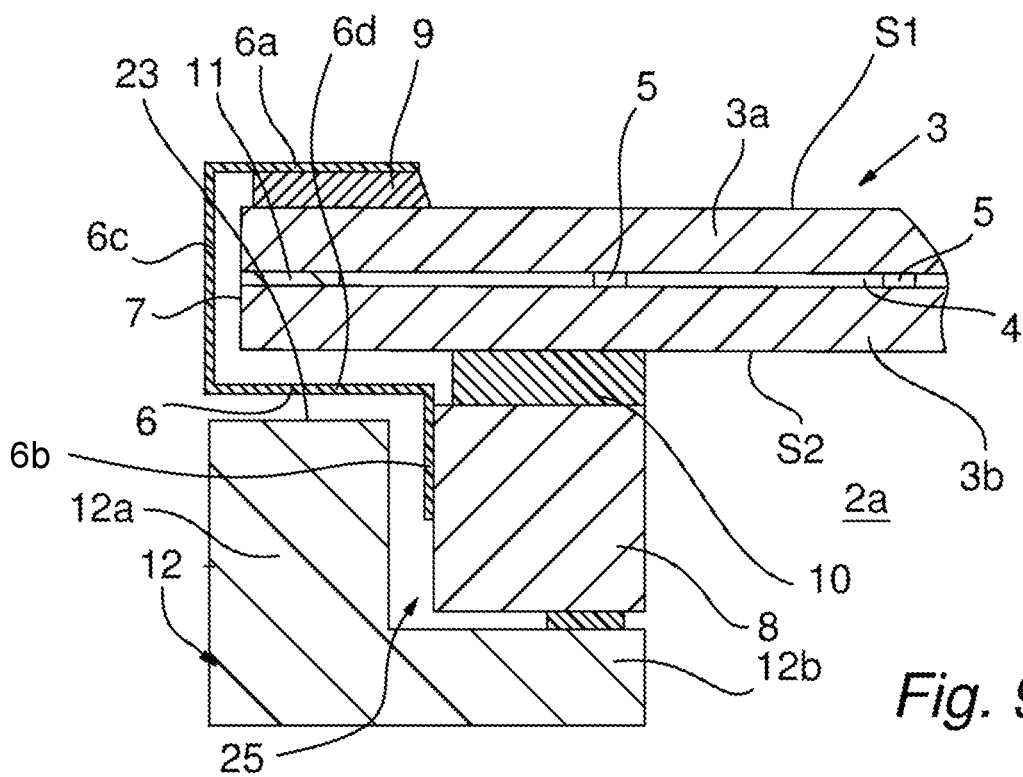
Figures 10, 11:
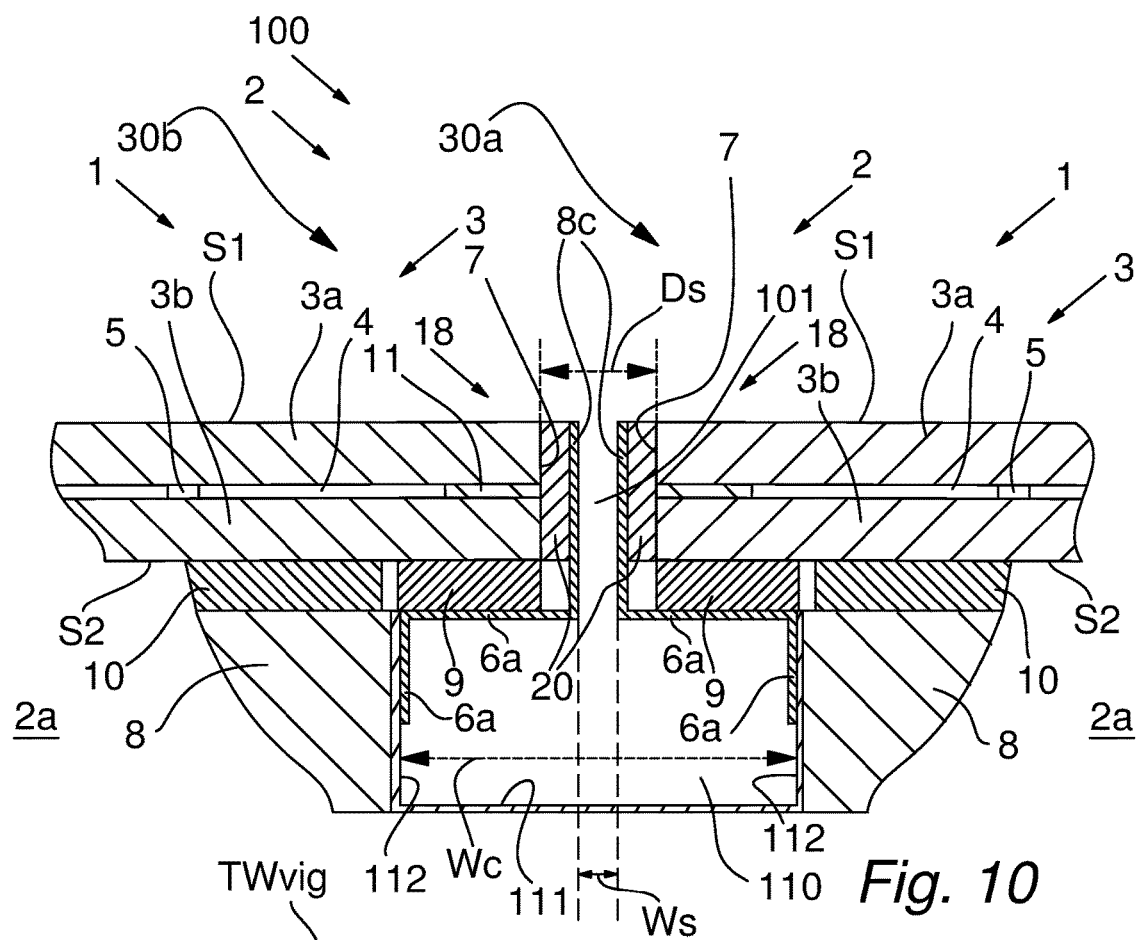
Figure 12:
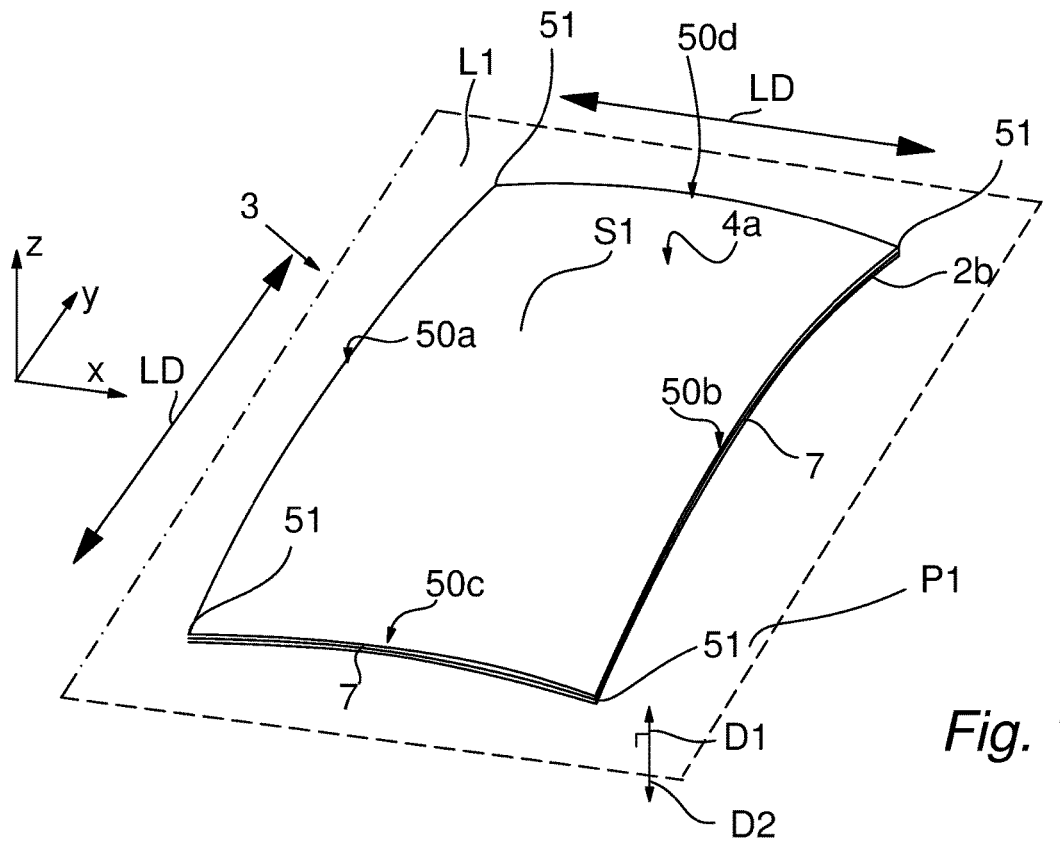
Figure 13:
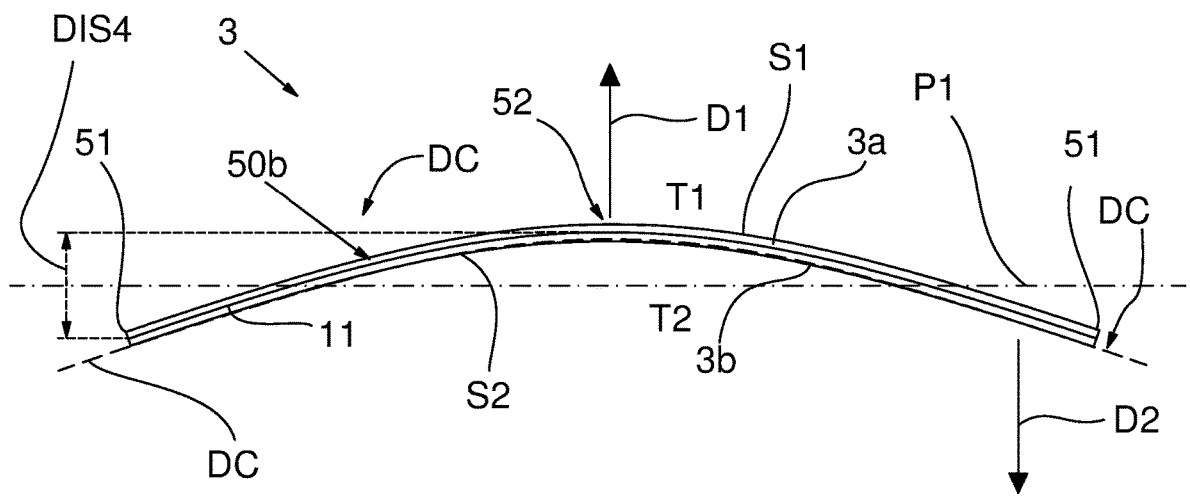
Figure 14:
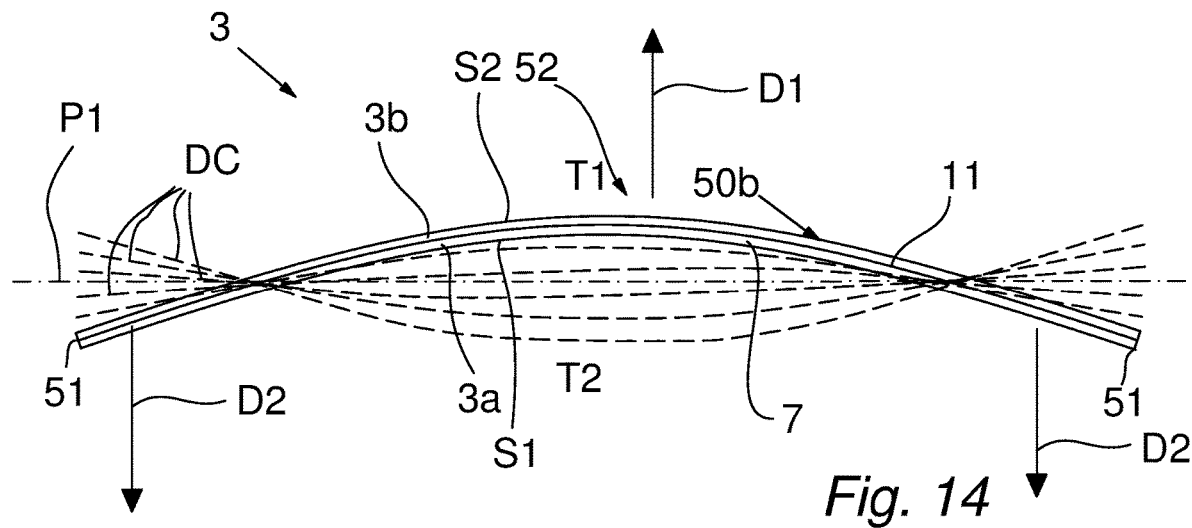
Figure 15:
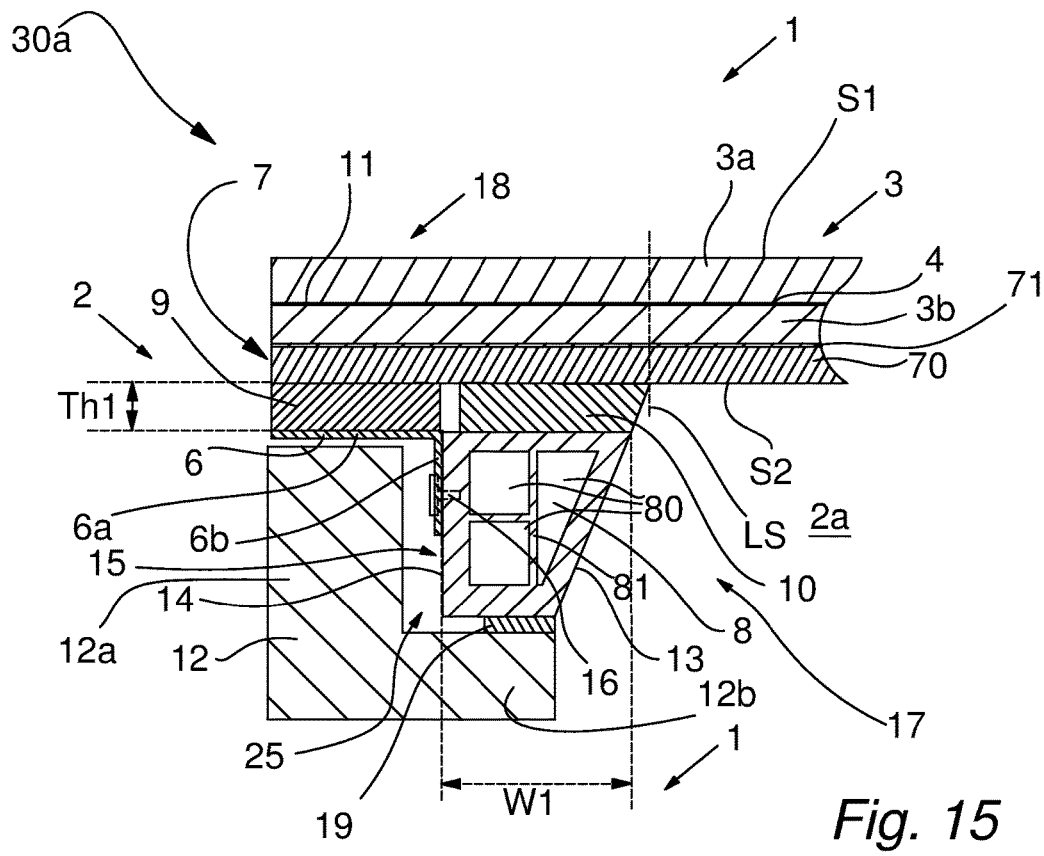
Figure 16:
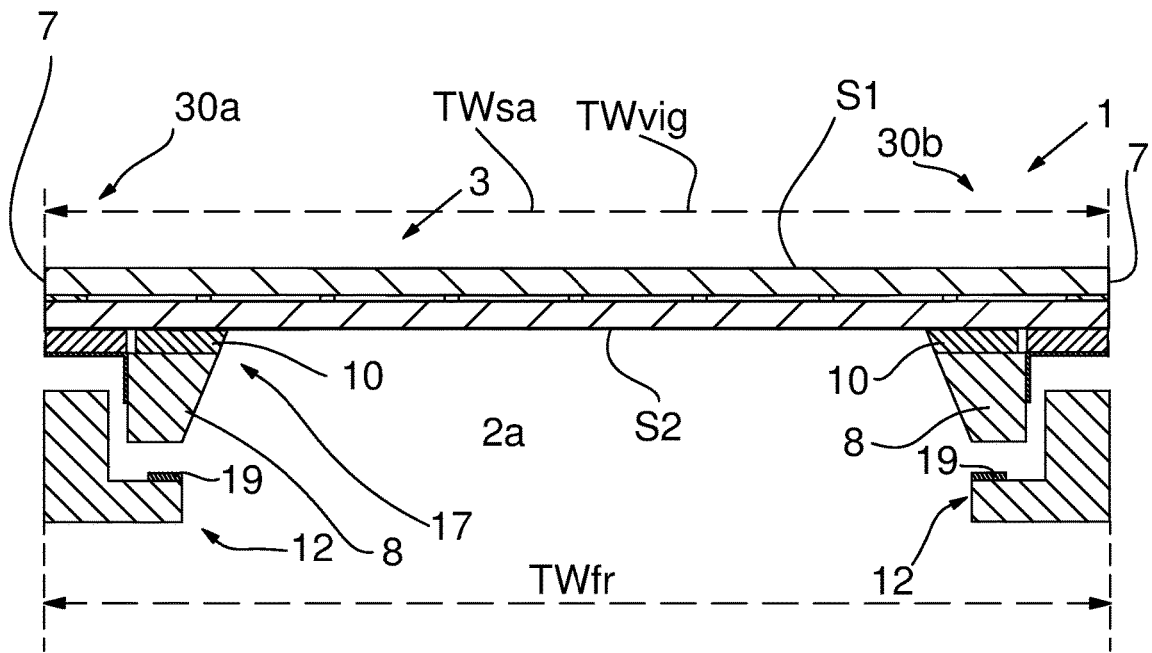
Figure 17:
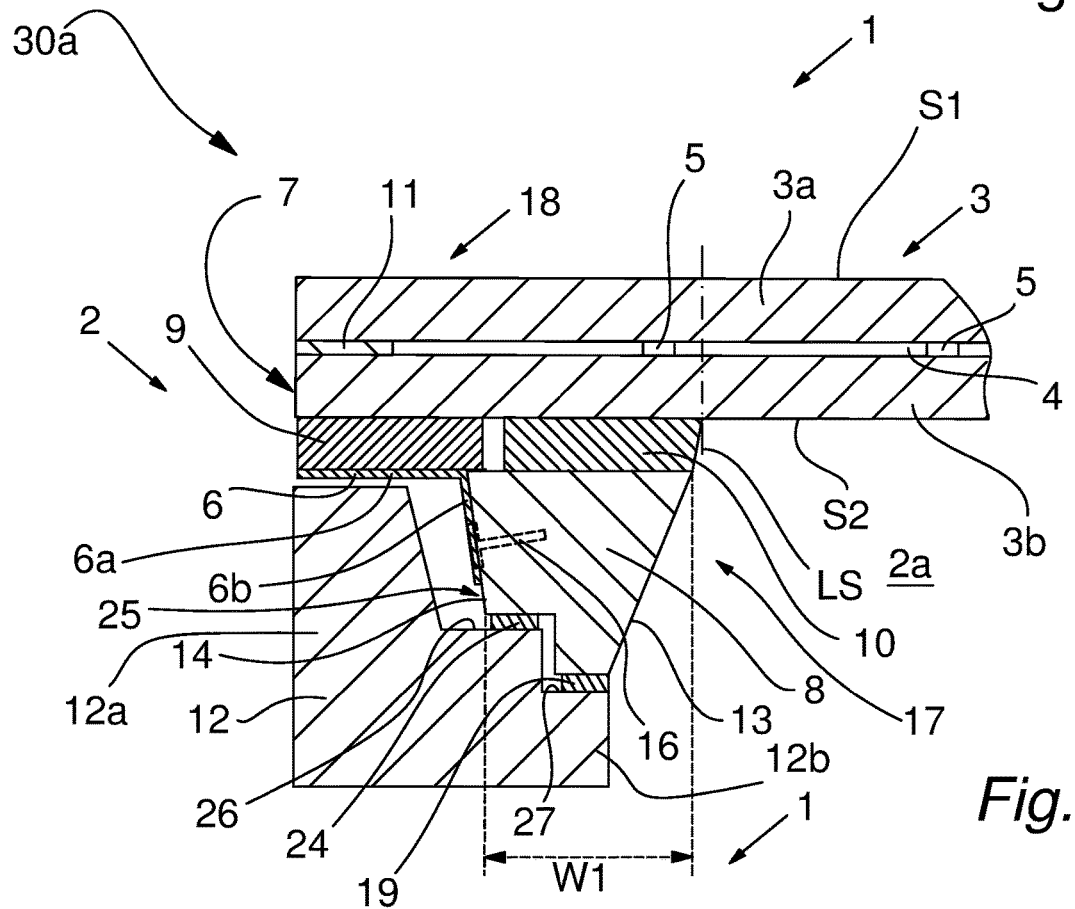
Figure 18:
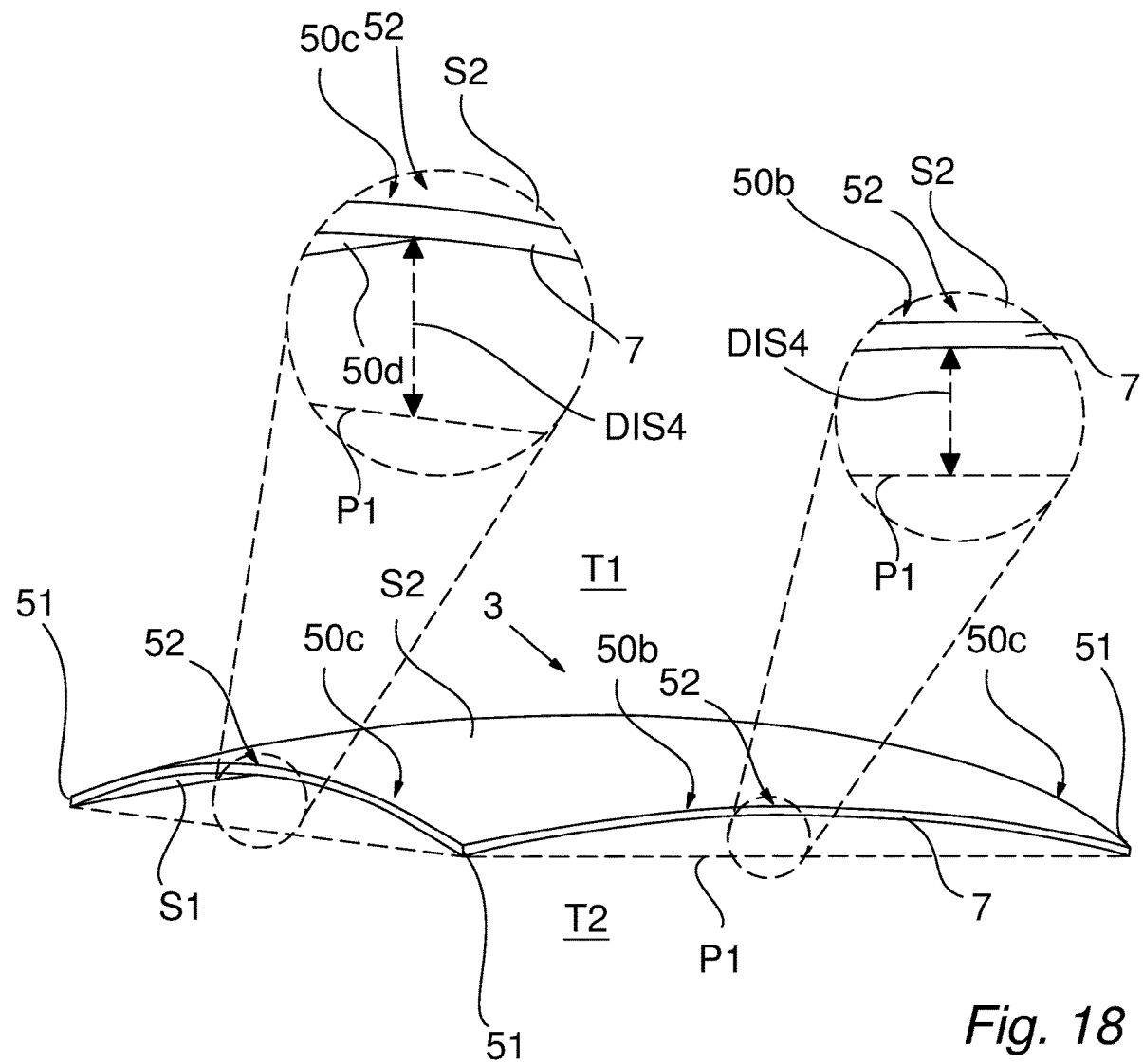
Figure 19:
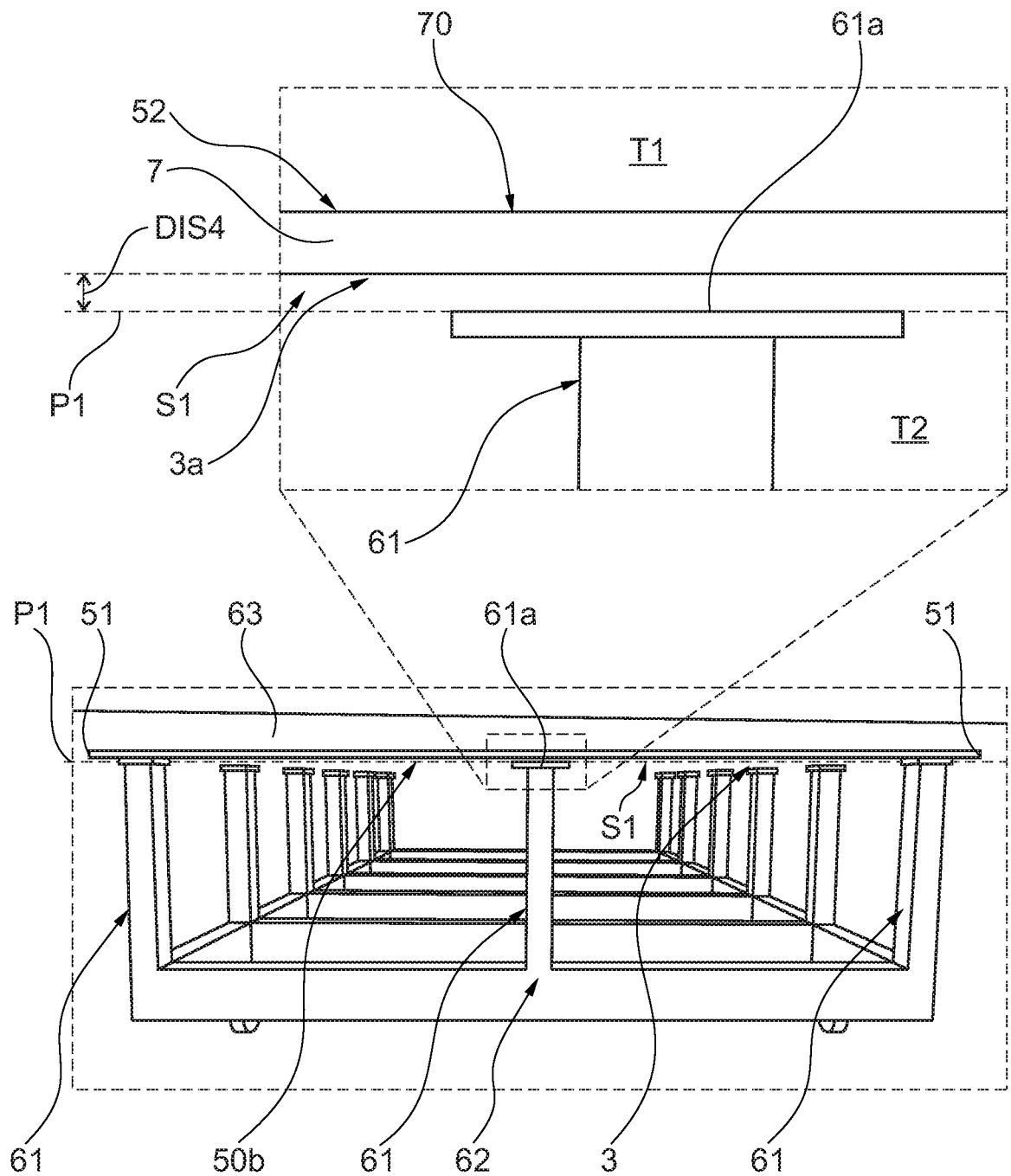
Figure 20:
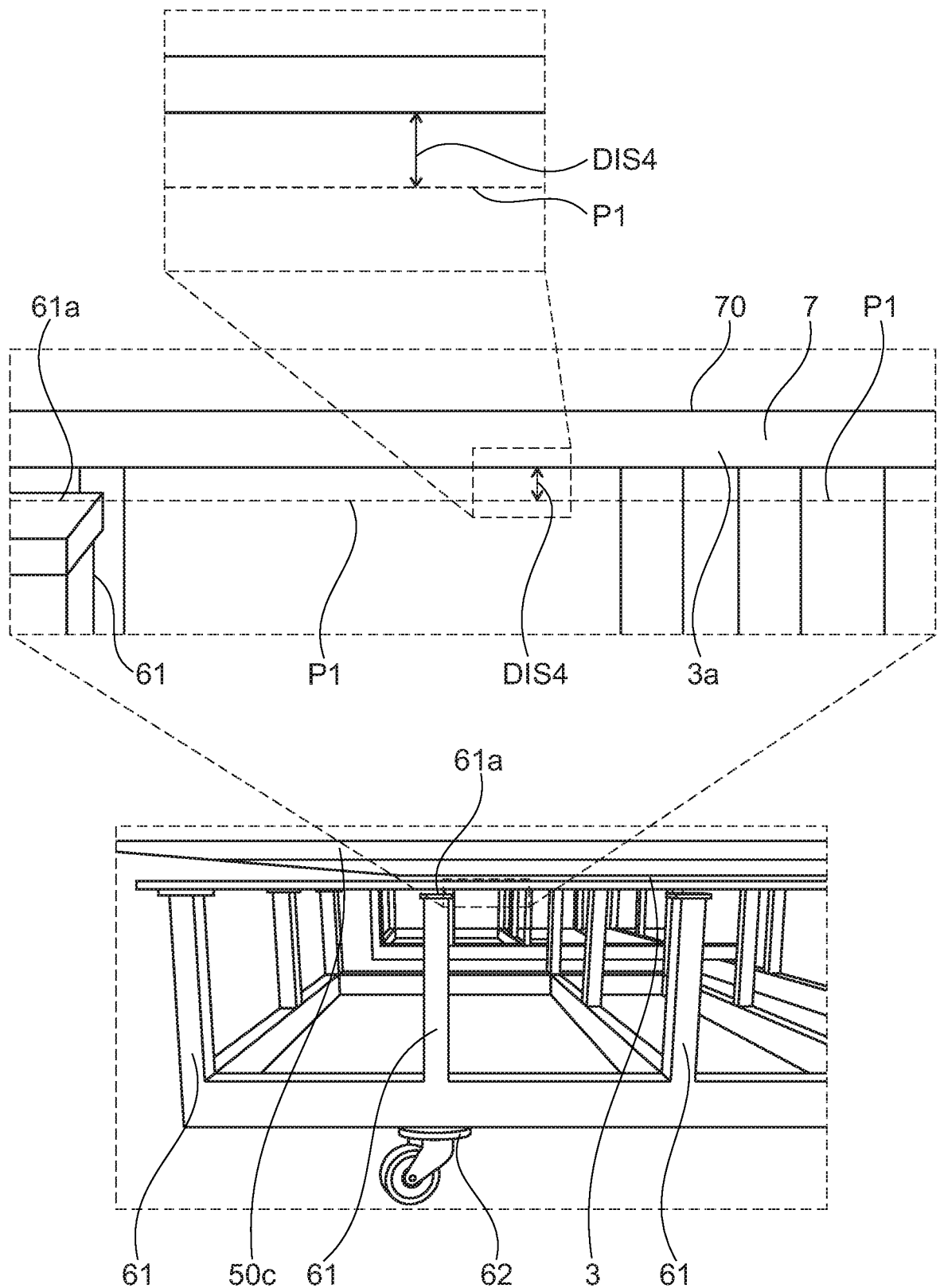

Aspects of the present disclosure will be described in the following with reference to the figures in which:

FIG. 1: illustrates an aperture cover such as a window or a door according to embodiments of the present disclosure, FIG. 2: illustrates a VIG unit according to embodiments of the present disclosure, FIGS. 3-4: illustrates building aperture covers which are roof window solutions according to embodiments of the present disclosure FIGS. 5a-5b: illustrates an aperture cover according to various embodiments of the present disclosure, FIG. 6: illustrates an aperture cover where a connection profile comprises a protection wall according to various embodiments of the present disclosure, FIG. 7: illustrates an aperture cover according to embodiments of the present disclosure where a fixation wall of a connection profile is attached to an exterior surface of a VIG unit and where the connection profile also comprises a water skirt, FIG. 8: illustrates an aperture cover according to embodiments of the present disclosure, where a connection profile of a sash comprises a water skirt wall, FIG. 9: illustrates an aperture cover according to further embodiments of the present disclosure where a fixation wall of a connection profile is attached to an exterior surface of a VIG unit, FIG. 10: illustrates a building aperture cover arrangement according to embodiments of the present disclosure, FIG. 11: illustrates a building aperture cover arrangement according to embodiments of the present disclosure, comprising columns and rows of building aperture covers placed close together, FIGS. 12-14: illustrates a VIG unit according to embodiments of the present disclosure, where the VIG unit is subjected to thermal deflection due to temperature difference between the glass sheets of the VIG unit, FIG. 15: illustrates an aperture cover according to embodiments of the present disclosure, comprising a laminated VIG unit, FIG. 16: illustrates total width and/or height of an aperture cover according to embodiments of the present disclosure, FIG. 17: illustrates an aperture cover according to embodiments of the present disclosure, comprising multiple gaskets placed between a sash and a fixation frame, FIG. 18: illustrates a visualized computer simulation of a thermal deflection of a VIG unit, and FIGS. 19-20: illustrates a thermal deflection test of a laminated VIG unit.

DETAILED DESCRIPTION

In relation to the figures described below, where the present disclosure may be described with reference to various embodiments, without limiting the same, it is to be understood that the disclosed embodiments are merely illustrative of the present disclosure that may be embodied in various and alternative forms. The figures are not to scale; some features may be exaggerated or minimized to show details of particular components. Therefore, specific structural and functional details disclosed herein are not to be interpreted as limiting, but merely as a representative basis for e.g. teaching one skilled in the art to variously employ the present disclosure.

FIG. 1 illustrates schematically a building aperture cover in the form of a window 1 according to embodiments of the present disclosure. The window comprises a vacuum insulated glass (VIG) unit 3 fixed in a frame 2. The frame 2 comprises elongated structural frame arrangements 30a-30d, and the VIG unit 3 is arranged to cover a frame opening 2a in the frame. The frame defines a frame opening plane P2, and in FIG. 1, the window is seen from the outside towards the exterior surface S1 of the VIG unit.

The frame arrangements 30a-30d comprises substantially parallel top 30d and bottom 30c frame arrangements and substantially parallel side profile frame arrangements 30a, 30b. In FIG. 1, the VIG unit is arranged in a frame 2 in form of a sash which is connected to a fixation frame 12 by means of a displacement mechanism such as one or more hinged connections (not illustrated in FIG. 1) configured to allow the sash to move relative to the fixation frame 12. Hence a user, such as a habitant living in a building comprising the window may open and close the window by operating the sash, either by hand or by a remote control, such as a wireless remote control that is configured to control an electrically operated actuator device such as a linear actuator such as a spindle or chain drive (not illustrated in FIG. 1.

In other embodiments, the frame 2 may also be fixed in an un-openable manner to the fixation frame 12 or directly to a building structure.

A gasket arrangement 10, a bonding seal 9 (described in more details later on) and/or the like may in one or more embodiments of the present disclosure be arranged to seal a space between parts of the frame 2 and the VIG unit 3. In the present example, a gasket 10 at the interior surface of the VIG unit (see for example FIG. 5a-5b) defines a "line of sight" through the frame opening 2a and through the VIG unit 3 in the frame.

FIG. 2 illustrates schematically a cross sectional view of a VIG unit 3 to be arranged in the frame 2 according to embodiments of the present disclosure. The VIG unit 3 comprises two glass sheets 3a, 3b such as tempered glass sheets, e.g. thermally tempered glass sheets, but it is understood that one or both glass sheets 3a, 3b may also be float glass sheets such as annealed glass sheets.

The glass sheets 3a, 3b are separated by an evacuated gap 4 located between the glass sheets 3a, 3b, and a plurality of support structures 5 are distributed in the gap 11. The thickness/width of the gap 4 may for example be 0.05-0.5 mm such as between 0.09 mm and 0.25 mm (measured normal to a plane P1 defined by a major surface of one of the VIG unit glass sheets 3a, 3b at a temperature difference between the VIG glass sheets 3a, 3b of substantially 0° C. The gap 4 is sealed by an edge sealing 11, such as a fused edge sealing, which may e.g. be made from a solder glass material, e.g. low melting point temperature solder glass material, or a metal solder material.

The support structures 5 may for example be made from metal, such as a steel alloy, glass or a polymer composition and be arranged in a grid or another pattern to maintain the gap 4 between the glass sheets 3a, 3b when the gap 4 is evacuated to a pressure below e.g. $10^{-3}$ bar, such as below $10^{-4}$ bar, e.g. to about or below $10^{-3}$ mbar. The glass sheets 3a, 3b comprises major surfaces S3, S4 facing the gap 4, and the support structures 5 support on these inner major surfaces. The VIG unit also comprises outwardly facing major surfaces S1, S2 facing away from the gap 4.

The Uc-value of the vacuum insulted glass unit may be below 0.7, such as below 0.6 or below 0.5.

Especially if the VIG unit glass sheets 3a, 3b are tempered glass sheets, the distance/pitch between neighbouring/adjacent support structures 5 may be above 3 cm or above 4 cm, such as between 3 cm and 6 cm or even more at least some locations in the evacuated VIG unit gap 4.

As described in more details later on, the VIG unit 1 may also be a laminated VIG unit and/or a VIG unit of a hybrid type comprising a further glass sheet providing a further sealed gap between this glass sheet and the VIG unit that may be filled with a gas.

The VIG unit's thickness, measured between the outer, outwardly facing surfaces S1, S2 of the VIG unit, determined in a direction normal to these surfaces, may in embodiments be between 4-15 mm such as between 4-12 mm, e.g. 4-10 mm, This thickness may preferably include an optional lamination glass sheet and lamination interlayer.

The VIG unit 1 defines a VIG unit plane P1 that will extend parallel to or coincide with the frame opening plane P2 (see FIG. 1) when the VIG unit is arranged in the frame 20. This plane P1 may e.g. be determined when the VIG unit glass sheets 3a, 3b have the substantially same temperature and no substantial thermal deflection of the VIG unit occur, i.e. when a temperature difference (ΔT) between the glass sheets 3a, 3b enclosing the gap is substantially 0 (ΔT=0° C.).

FIG. 3 schematically illustrates an embodiment of the present disclosure, wherein the aperture cover is a building aperture cover in the form of a roof window 1. The roof window is configured to be placed in a roofing structure of a building, such as a building for habitants, an office building or the like. The roof window may in embodiments of the present disclosure be arranged between two roof trusses, but it may also be arranged to another part of the roof structure in further embodiments. The roof window may either be configured to be arranged with an angle between 5° and 85°, such s between 10° and 75°, compared to horizontal, and rain and melting water, dew and the like will thus be guided towards a bottom part/end of the window due to gravity.

The roof window 1 comprises a frame 2 in the form of a movable sash 17 which is connected to a fixation frame 12 of the aperture covering 1 by means of a displacement mechanism 80 such as one or more hinged connections configured to allow the sash 2 to move relative to the fixation frame 12. In the example of FIG. 3, the roof window is a pivot roof windows comprising pivot hinges 80 providing an axis of rotation placed between the top and bottom of the sash. Often the axis of rotation is substantially about the centre. But sometimes the axis of rotation can for example be raised such as ⅓ of the total window or sash height. The hinge connection 80 is so that a top end part of the sash is configured to move inwards and a bottom end part of the sash 17 is configured to move outwards when opening the sash from a closed position.

A pivot roof window may e.g. allow rotation of the sash 2 so the exterior surface S1 of the VIG unit may be cleaned from the inside. The weather proofing and water drain for especially roof windows should be carefully designed for roof windows that can be opened, including pivoting roof windows.

As can further be seen, the roof window in FIG. 3 may in embodiments of the present disclosure comprise an architectural covering 75, in the present example a roller shutter, but it may also be a blind such as a venetian blind, a roller blind or the like in further embodiments. The roller shutter may be electrically operated by means of an electric motor (not illustrated), so as to open or close the roller shutter and controlled by an automation solution and/or by means of a wired or wireless remote control. As can be seen, the roller shutter can be placed at the exterior side of the window.

It is however understood that in further embodiments of the present disclosure, the roller shutter and/or other types of architectural coverings may be omitted from the roof window.

FIG. 4 schematically illustrates a roof window 1 according to an embodiment of the present disclosure, seen from the side, wherein the roof window is a top-hung roof window. Here, the sash 17 is connected to the fixation frame 12 at the top part by a hinge arrangement, and the top part does hence not pivot inwards when the sash with the VIG unit is opened.

Generally, for both types of roof windows as illustrated in FIGS. 3 and 4, the window may as illustrated in FIG. 4 be assigned with an electric actuator 90 such as a spindle actuator or chain actuator. The actuator 90 can be operated by an input from an automation system or a wired or wireless remote control to open or closed the sash 2. The actuator 90 may be arranged at the top part (relevant for the pivot roof window, see FIG. 3) or bottom part of the sash 17.

FIGS. 5a-5b illustrates a cross section of an elongated structural side frame arrangement 30a of a building aperture cover frame 2 illustrated in FIG. 1, according to embodiments of the present disclosure, in the cross sectional view A-A illustrated in FIG. 1. It is understood that the cross section may be the same for the elongated arrangement 30b, 30c and/or 30d. Generally, the cross section may be similar for two, three or all four frame arrangements 30a-30d, but in some embodiments, for example just the side frame arrangements 30a and 30b may be the same, e.g. together with the bottom and/or top frame arrangement 30c-30d.

A VIG unit 3 is arranged in the frame 2 in the form of a sash 17. The sash 17 comprises an elongated structural frame member 8. Each of the structural frame arrangements 30a-30d may comprise such a structural frame member, 8, and these together defines the frame opening 2a.

The elongated structural frame member 8 comprises an inner side surface 13 facing the frame opening 2a, and an opposing outer side surface 14.

A part 18 of the outer edge section 18 of the VIG unit overlaps the elongated structural frame member 8 so that the edge surface 7 of the vacuum insulated glass unit 3 extends beyond the outermost part of the side surface 14 of the overlapped elongated structural frame member 8.

The sash 17 comprises an elongated connection profile 6 comprising a connection wall member 6a which extends parallel to the overlapped structural frame member 8, and which is connected to the interior outer major surface S2 of the vacuum insulated glass unit 3. Additionally, the elongated connection profile 6 comprises a fixation member 6b which is connected to the overlapped structural frame member 8 so that the VIG unit is fixed to the structural member 8 through the elongated connection profile 6.

As can be seen, substantially the entire VIG unit's outer surface S1 of the overlapping part 18 may be exposed so that no part of the frame extend in over the outer surface S1 of the VIG unit.

In FIGS. 5a and 5b, the connection wall member 6a covers and is attached to a part of an interior outer major surface S2 of the VIG 3 which extends beyond the outermost part of the side surface 14 of the overlapped structural frame member 8. The connection wall member 6a covers and is attached to a part of the outer major surface S2 of the VIG unit 3 which faces the overlapped structural frame member 8.

As can also be seen in FIGS. 5a and 5b, the fixation member 6b of the connection profile 6 may be connected to the overlapped structural frame member 8 from the outer side of the overlapped structural frame member 8, and may here abut the outer surface 14 facing away from the frame opening 2a The fixation member 6b may preferably be an elongated fixation wall which is aligned with a part of the opposing outer side surface 14 of the overlapped structural frame member (8).

The elongated connection profile 6 may preferably be a metal profile such as an aluminium profile or a steel profile, but it may also be a polymer, such as plastic, profile in other embodiments. The metal profile comprising the connection wall 6a member and the fixation member 6b may in aspects of the present disclosure be an extruded or pultruded profile, or it may be a roll shaped profile.

As can be seen, the connection member 6a and the fixation wall member 6b in FIGS. 5a-5b together provides an angle bracket shape and comprises an L-shape, when seen in a plane which is perpendicular to the longitudinal direction LD (see FIGS. 1, 3 and 4) of the connection profile 6.

It is generally understood that the angle between the walls 6a, 6b may be approx. 90° as illustrated but it may also be an obtuse or acute angle (not illustrated in FIG. 5a-5b, see FIG. 17) dependent on the orientation of the surface 14 of the overlapped member 8, relative to the orientation of the outer major surface S2 of the VIG unit.

The fixation member 6b is releasably fixed to the elongated, structural member 8 by means of mechanical fasteners 16 such as one or more of a snap connection, screws, nails or pop rivets. If the overlapped structural member 8 is made from wood, these may be screws and/or nails. In other embodiments, the overlapped structural member 8 may be a polymer profile such as a plastic material profile and/or a fibre-reinforced material, such as a carbon or glass fibre profile. Here, the overlapped structural member 8 may comprise elongated grooves for connection purposes, e.g. for receiving connection hardware such s mountings. Also, in embodiments, protruding pins (not illustrated) may be inserted into blind holes of the member 8 so as to transfer forces. Then a fastener may hold the parts in position but does not have to transfer all the forces.

The fixation member 6b may be recessed (not illustrated) into a recessed part of the surface 14, or may as illustrated not be recessed into the surface 14, and hence extend from the surface 14 and into the space 25 with a distance corresponding to the thickness of the wall of the fixation member 6b.

The connection member 6a is connected to the outer major surface S2 of the vacuum insulated glass unit 3 by means of a bonding seal 9. The bonding seal 9 may be or comprise an adhesive such as structural adhesive such as a silicon adhesive, a silane-terminated polyurethane (SPUR) adhesive or a Modified-Silyl Polymer (SMP) adhesive. In preferred embodiments, the bonding seal 9 extends along least 50%, such as at least 70%, e.g. at least 90% such as substantially 100% of the length of the connection wall 6b. However, in embodiments of the present disclosure, the bonding seal may extend along less than 100%, such as less than 90% or less than 80%, such as at least 60%, of the length of the connection wall 6b.

The bonding seal 9 has a thickness Th1 between 4 mm and 30 mm, for example between 4 mm and 13 mm, such as between 4 mm and 10 mm, for example between and 10 mm, at a temperature difference between the two glass sheets 3a, 3b of the vacuum insulated glass unit of substantially 0° C. The thickness Th1 is preferably above 4 mm, above 5 mm or above 6 mm.

It is generally understood that overlapped structural frame member 8 is one or more of an elongated structural top frame member, an elongated structural bottom frame member and/or an elongated structural side frame member. The overlapped frame member may preferably be at least an elongated structural bottom frame member 8b and/or structural, parallel side frame members.

The sash 17 comprising the overlapped structural frame member 8 and the connection profile 6 is movably connected to a fixation frame 12 by means of one or more hinge connections (80—see FIGS. 3-4). The sash 17 may in preferred embodiments be a top-hung sash. The fixation frame 12 comprises an outer elongated side member 12a arranged opposite to the outer side surface 14 of the overlapped elongated structural frame member 8, at least when the sash 17 is in a closed position. In FIG. 5a, the sash is in a closed position, and in FIG. 5b, the sash 17 has been moved away from a closed position and towards an open position.

A space 25 is provided between the fixation frame 12 and the overlapped member. In FIG. 5a-5b and several of the other figures described below, the space extends around the overlapped member 8 of the sash 17 and to also be between the lower/further frame part 12b and the overlapped member 8 of the sash 17 when the sash is in a closed position.

As can be seen from FIGS. 5a-5b, the part 18 of the vacuum insulated glass unit 3 extending beyond the outer side surface 14 of the overlapped elongated structural frame member 8 of the sash 17 may moreover overlap a part of the outer elongated side member 12a of the fixation frame 12, at least when the sash 17 is in a closed position.

The overlapped, structural member 8 of the sash 17 is placed between the vacuum insulated glass unit 3 and an elongated lower/further frame part 12b of the fixation frame member 12, at least when the sash 17 is in a closed position. Additionally, the fixation member 6b is placed between the outer elongated side member 12a of the fixation frame 12, and the overlapped, structural member 8. Also, in embodiments of the present disclosure (not illustrated) the member 6b may extend to and be placed between the elongated lower/further frame part 12b of the fixation frame 12, and the and the overlapped, structural member 8.

It is understood that the bottom frame part 12 of the fixation frame may 12 may be omitted in other embodiments of the present disclosure.

A tightening gasket 19, such as a rubber gasket or a foam gasket, is placed between the fixation frame 12 and the overlapped structural frame member 8, such as so as to abut the overlapped structural frame member 8. This gasket 19 provides heat insulation and/or prevents condensation water or the like to enter from between the profiles 8, 12a and interior the interior of the room.

It is generally to be understood that the sash 17 is considered to comprise at least the overlapped structural member 8 and the connection profile 6 in FIGS. 5a-5b. The hinged connection as previously mentioned may be connected to the profile 6 or the overlapped structural member 8.

The overlapped elongated structural member 8 has a maximum width (W1) at the widest part of the overlapped elongated structural member 8 which in embodiments of the present disclosure may be between 25 mm and 100 mm, such as between 30 mm and 70 mm, for example between 35 mm and 60 mm. The maximum width W1 is in FIG. 5a-5b measured/defined at a part of the overlapped profile 8 substantially proximate to the vacuum insulated glass unit 3, and between the inner side surface 13 and the opposing outer side surface 14, in a direction substantially parallel to a major surface S1, S2 of the vacuum insulated glass unit.

A tightening gasket strip 10, such as a resilient gasket strip, is arranged between the elongated structural member 8 and the interior major surface S2. The gasket strip 10 may as illustrated, in embodiments of the present disclosure, define the "line of sight" LS through the VIG unit 3 and the frame 2a The gasket 10 may be a rubber and/or a foam gasket, or an elastomer gasket.

The gasket may in further embodiments (not illustrated) comprise one or more pre-deflected resilient lips such as rubber or elastomer lips that will be further or less deflected in response to a thermal deflection of the VIG unit.

The line of sight LS may generally be defined by an envisaged line that is perpendicular to the interior surface S2 of the VIG unit and which provides the outermost border for a view through the VIG unit and frame opening 2a from the interior side of the VIG unit.

The gasket strip 10 has a thickness Th2. This thickness may in embodiments of the present disclosure be between 4 mm and 30 mm, such as between 6 mm and 20 mm, for example between 5 mm and 15 mm, or such as between 9 mm and 18 mm at a temperature difference ($\Delta T=T1-T2$) between the two glass sheets 3a, 3b of substantially 0° C., and wherein said thickness Th3 is measured in a direction perpendicular to the interior major surface S2. Preferably, the thickness Th2 of the gasket 10 may be above 5 mm, such as above 6 or 7 mm.

In embodiments of the present disclosure, a minimum distance between an outer major surface S1, S2 of the vacuum insulated glass unit and the elongated member 8 may be at least 4 mm such at least 5 mm, for example at least 6 mm at a temperature difference $\Delta T=T1-T2$ between the two glass sheets 3a, 3b of the vacuum insulated glass unit 3 of substantially 0° C. The minimum distance may e.g. substantially correspond to the thickness Th2.

The resilient gasket strip 10 may be a pre-compressed or pre-deflected gasket strip providing that the resiliency of the material will cause the gasket to expand when the VIG unit thermally deflects and the gasket 10 may be further compressed when the VIG unit thermally deflects dependent on the deflection direction.

In FIGS. 5a-5b, the connection wall 6a extends over and covers the upper surface 23 of the fixation frame 12, in FIG. 5a-5b, it covers substantially the entire surface, but it may also cover less of the surface 23. The wall 6a may e.g. cover between 20% and 100%, such as between 50% and 100%, for example between 50% and 95% of the surface 23.

The distance DIS2 from the outer edge surface 7 and to a line L1 perpendicular to the major surfaces S1, S2 of the VIG unit 3 and bordering/tangent to the inner edge surface 13 where the VIG unit starts to overlap the member 8 may in embodiments of the present disclosure be at least 25 mm, such as at least 35 mm, such as at least 50 mm. The distance DIS2 may be at or below 100 mm, such as below 70 mm, for example below 50 mm.

In one or more embodiments of the present disclosure, the ratio between the distance DIS2 and the length LEL of the longest edge of the vacuum insulated glass unit 3 (see edges 50a and 50b in figures illustrating edge deflection) is at least $$\frac{DIS2}{LEL} = \frac{25}{LEL}$$

such as at least $$\frac{35}{LEL},$$

for example at least $$\frac{50}{LEL}.$$

For example, the ratio may, if the length LEL of the longest edge(s) is 1400 mm and DIS2 is 40 mm, be DIS2/LEL=40/1400=0.029. The ratio between the distance DIS2 and the longest edge length LEL may preferably be within 0.015 and 0.07, such as between 0.017 and 0.06, for example between 0.018 and 0.05.

The bonding seal 9 may be located opposite to the evacuated gap 4, but it may also be arranged to lap in over and thus be opposite to the edge seal 11 of the vacuum insulated glass unit. The bonding seal 9 may be moved further in over the gap 4, away from the edge 7 (see e.g. FIG. 7) and may thus not be placed opposite to the edge seal 11 in order to allow a more free thermal deflection of the VIG edge.

In embodiments of the present disclosure, the bonding seal 9 may have a width of between 2 mm and 30 mm, such as between 3 mm and 15 mm, for example between 4 mm and 13 mm, measured in a direction perpendicular to the surface 7 and to the longitudinal extent LD of the bonding seal 9, and parallel to the outer surface of the VIG unit to which it bonds.

The bonding seal 9 width W2 may in embodiments of the present disclosure be above 2 mm, such as above 4 mm, for example above 6 mm or above 8 mm. The bonding seal 9 width W2 may in embodiments of the present disclosure be below 15 mm, for example below 10 mm below 6 mm or about or below 4 mm.

The width is determined perpendicular to the longitudinal extent of the edge surface 7, along the major surface S2.

In embodiments of the present disclosure, the width W2 may be between 2 mm and 15 mm, such as between 2 mm and 10 mm, such as between 2 mm and 6 mm or between 2 and 4 mm. The width W2 may be substantially constant in the entire length of the bonding seal (at a temperature difference between VIG glass sheets 3a, 3b of substantially 0° C.), or may alternatively be varied to be different around/near the corner area of the VIG unit which may be from the corner of the edge and up to between 10 cm and 25 cm from the corner in the longitudinal direction of the edge surface 7 and the bonding seal, when compared to the width W2 at the remaining part of the seal 9 the VIG unit 3.

It is generally understood that a resilient gasket, such as a rubber gasket or the like (not illustrated) may in further embodiments be placed at the side of the bonding seal 9 that faces away from the gasket 10 in order to ensure sufficient water tightness. This gasket may be attached to the wall 6a or additionally or alternatively to the VIG unit surface S2 bonded to the bonding seal.

FIG. 6 illustrates a cross section of an elongated structural frame arrangement 30a of a building aperture cover frame 2, where the connection profile 6 comprises a further protection wall 6c which extends opposite to and along, and thus covers and mechanically protects, the edge surface 7 of the vacuum insulated glass unit 3. A flexible, such as resilient, water sealing 20 is placed between the protection wall 6c and the edge surface 7. This may e.g. be a rubber sealing, a butyl sealing and/or the like. The exterior VIG unit surface S1 is in FIG. 6 exposed all the way to the edge 7a where the surface S1 is terminated.

As illustrated in FIGS. 5a-6, and also some of the figures described below, the evacuated gap 4 of the VIG unit overlaps the elongated structural member 8 with a certain distance DIS1, see FIG. 6. The evacuated gap 4 may generally overlap DIS1 the elongated structural member 8 by between 50% to 100% of the maximum width W1, such as between 80% to 100% of the maximum width W1 of the overlapped structural member 8. The distance DIS1 is determined parallel to a plane P1 defined by an outer major surface S1 of the vacuum insulated glass unit 3 at a temperature difference between the glass sheets 3a, 3b of substantially 0° C. The distance DIS1 is determined from the inner surface 11a of the edge seal 11 facing the evacuated gap 4, and to a line of sight LS through the vacuum insulated glass unit 3 and the frame opening 2a. The "line of sight" LS is determined as perpendicular to the outer surfaces S1, S2, and is in FIG. 8 illustrated as defined by the edge of the gasket 10 extending into the frame opening, but it may also alternatively be defined by the outer surface 13 of the member 8 facing the frame opening 2a.

In FIG. 6 and also FIGS. 5a-5b and FIG. 7, the evacuated gap 4 may overlap DIS1 the entire width W1 of the elongated structural member 8, and moreover extend beyond the outer surface 14 of the overlapped structural member 8.

The bonding seal 9 may as illustrated in some of the figures be placed opposite to the edge seal 11, but may in other embodiment also be placed opposite to the gap 4. The VIG unit edge may in embodiments of the present disclosure extend between 1 cm and 10 cm, such as between 1 cm and 5 cm, or between 2 and 4 cm out over the outer surface 14 of the elongated structural member, measured from the outer surface 14 and to the end edge 7 of the VIG unit, in a direction parallel to the plane P1, and perpendicular to the longitudinal extent LD of the edge surface 7.

In FIG. 6, the connection wall 6a extends over and faces the upper surface 23 of the fixation frame 12. The connection wall 6a extends parallel to the surface 23. Generally, as illustrated in both FIGS. 5a, 5b and 6, and also in some of the other figures described below, the connection wall 6a may in embodiments of the present disclosure placed between the interior surface S2 and the upper surface 23 of the fixation frame.

In some embodiments of the present disclosure, a masking (not illustrated) such as a sheet, plate or coating, such as a ceramic coating, may be arranged at the VIG unit opposite to the structural member 8 and/or the frame member 12a in order to hide a part of the structural member 8 and/or 12a that may otherwise be visible through the VIG unit from the outside. This may help to provide the impression of a larger window surface and hence narrower frame, while at the same time hiding parts of the frame from the outside. In case of the ceramic coating, it may be provided as a coating burned into/onto the glass during a tempering of the glass sheet 3a or 3b.

In FIG. 7, the connection profile 6, in addition to the protection wall 6c, comprises that the connection wall member 6a is placed to cover the exterior surface S2, and extends from the protection wall 6c. In this embodiment, the connection wall member 6a covers and is attached to a part of the outer major surface S1 of the vacuum insulated glass unit which faces away from the overlapped structural frame member 8, and the profile 6 accordingly extends up and over the outer edge surface 7 of the VIG unit. The bonding seal 9 is hence placed at the exterior surface S1. However, it is understood that a bonding seal 9 as previously described may also in further embodiments be placed between an interconnecting wall member 6d of the connection profile 6 and the interior surface S2 (not illustrated in FIG. 7).

FIG. 7 moreover illustrates a further embodiment of the present disclosure, wherein the connection profile 6 comprises a water skirt wall 6e which is configured to interface with, and overlap, a flashing part 21 for water tightening. This may be especially relevant if the aperture cover 1 is a roof window. The water skirt 6e extends down over the outer surface 22a of the fixation frame member 12 when the sash 17 is in a closed position, so that the skirt 6e overlaps the flashing part 21. The flashing part 21 is made from a material that is not permeable to water, such as a plate, a flexible sheet or fabric that is made impermeable to water, or it may be a part of the outer roof material itself.

Additionally, FIG. 7 illustrates an embodiment of the present disclosure wherein a further adhesive material 15, such as an adhesive tape, is placed between the wall 6a and the surface S1 (or S2 dependent on the construction, see FIG. 5a-5b). The further adhesive material 15 is fixed to at least one of the wall 6a and the exterior major surface S1 of the vacuum insulated glass unit 3. This adhesive material 15, such as a double sided foam tape, for example acrylic foam tape, may help to provide a support function during manufacturing while the bonding seal cures, and/or it may help to provide a further fixation of the VIG unit to the metal profile, or provide improved insulating and/or protective capabilities.

FIG. 8 illustrates an embodiment of the present disclosure wherein the connection profile 6 comprises a water skirt wall 6e (see also FIG. 7) which is configured to interface with, and overlap, a flashing part 21 for water tightening as also illustrated in FIG. 7. However, here, the protection wall 6c is omitted and the connection wall 6a is connected to the interior VIG unit surface S2 by means of the bonding seal 9.

FIG. 9 illustrates an embodiment of the present disclosure wherein the connection profile comprises a protection wall 6c a previously explained, and the connection wall member 6a which extends parallel to the overlapped structural frame member 8 and is connected to the outer major surface S1 of the vacuum insulated glass unit 3. The connection profile 6 here comprises an interconnecting wall 6d which extends along the interior surface S1 of the VIG unit which extends beyond the outer surface 14 of the elongated structural member 8. The interconnecting wall connects the protection wall 6c with the fixation member 6b which is connected to the overlapped structural frame member 8. The profile 6 illustrated in FIG. 9 may also in further embodiments comprises a water skirt 6e as previously described (not illustrated in FIG. 9, see FIGS. 7 and 8.)

The interconnecting wall 6d extends over and covers the upper surface 23 of the fixation frame. The same is the case in the embodiment illustrated in FIG. 7. The connection wall 6a in FIGS. 7 and 9 covers at least a part of the upper surface 23 of the fixation frame 12 by extending in over the exterior surface S1 of the VIG unit 3.

FIG. 10 illustrates a building aperture cover arrangement 100 according to embodiments of the present disclosure, comprising two building aperture covers 1. The building aperture covers of the cover arrangement 100 may be one or more of the above mentioned embodiments described in relation to one or more of FIGS. 1-9. In FIG. 10 however, design of the frame 2 substantially corresponds to the design as illustrated in FIG. 6, without the fixation frame omitted.

It is generally understood that the building aperture cover arrangement 100 may comprise more than two building aperture covers 1 arranged side by side in a row, above each other in a column, or in a grid comprising both building aperture covers arranged side by side and above each other as illustrated e.g. in FIG. 11. It 100 may be arranged in a roof 102 and be roof windows, or alternatively it may provide or be arranged in an outer wall of a building such as an office building or a building for habitants.

The windows 1 are arranged next to each other so that side surfaces 7 of the vacuum insulated glass unit 3 are arranged substantially opposite to each other. The mutual distance Ds is provided between opposing edge surfaces 7 of the vacuum insulated glass units of the windows arranged next to each other. This mutual distance Ds is less than 12 cm, such as less than 7 cm, such as less than 4 cm or less than 2 cm, the distance may be even less, especially if the material 20 and/or the protection walls 8c are omitted.

A water guidance channel 110 is provided below the parts 18 of the vacuum insulated glass units which extends beyond the overlapped structural members 8, and out over the outer surface 14. The channel 110 receives water such as rain water that passes in between the edge surfaces 17 and into the space 101 between the edge surfaces 7 of the VIG units. Here the water will be guided downwards in the guiding channel on a guiding surface 111 due to gravity. Rainwater is thus configured to leave the window arrangement 100 at bottom parts of the window arrangement when the window arrangement is arranged in a building structure.

Generally, the largest width Wc of the water guidance channel 110 may be wider than the width Ws of the space 101, such as at least 10% larger, such as at least 60% larger or even more than 100% or more than 200% larger than the width of the space 101.

The water guidance channel 110 hence comprises a bottom part 111, side walls 112 and top walls, and where a part of the connection profiles 6 of the windows, in this case the connection walls 6a, provides, or may alternatively be integrated in, a part of said top walls.

Water in vertically arranged channels 110 will automatically be drained due to gravity. One or both of the side surfaces 112, or a guidance member arranged in the channel 110, may comprise an inclining surface (not illustrated), at least if it is a horizontally extending channel 110 placed between a top and bottom of a window. This guidance surface helps to will guide the water towards vertical guiding channels 110, See FIG. 11.

The water guidance channels 110 as illustrated in FIGS. 10 and 11 can accordingly act as drainpipes for water such as rainwater.

The space 101 may in further embodiments of the present disclosure be covered by a covering such as a flashing part (not illustrated) extending in the longitudinal direction of the space 101.

In FIG. 11, vertical channels 110 (see FIG. 10) underneath the spaces 101 may be interconnected and hence assure an almost hidden water drainage solution in the arrangement 100 between the channels enclosed by the aperture covers and covered by the overlapping parts 18 of the VIG unit.

FIGS. 12 and 13 illustrates schematically a VIG unit's 3 thermal deflection as a result of a temperature difference $\Delta T=T1-T2$ between the two VIG unit glass sheets 3a, 3b providing the evacuated gap 4, according to embodiments of the present disclosure.

In FIG. 12, the VIG unit 3 is shown schematically and in perspective, where it can be seen that the outer major surface S1 of the VIG unit 3 obtains a convex shape when a first temperature T1 (See FIG. 13) is higher than temperature T2 at the other side of the VIG unit, side whereas the outer surface S2 of the other (lower) glass sheet 3b (not visible in FIG. 10) provides a concave shape due to the thermal deflection and the evacuated gap 4.

The VIG unit 1 deflects relative to the VIG unit plane P1 (determined where $\Delta T$ is substantially zero) and relative to the frame opening (not illustrated in FIGS. 12-13), in the directions D1, D2 which are perpendicular to the plane P1. The plane P1 extends in the x-y direction. As can be seen the VIG unit edges 50a-50d provides a deflection curve (DC—See FIG. 13) causing the VIG unit edge centre 52 to move in the directions D1, D2 which are in the z direction, relative to the plane P1. This deflection curve DC is described between the corners 51 where the respective edge 50a-50d terminates.

The VIG unit 3 is rectangular and comprises longer, parallel edges 50a, 50b, and shorter end edges 50c, 50d.

FIG. 13 illustrates schematically and seen from the side onto the long edge 50b, the thermal deflection of the edge 50b. As can be seen, the VIG unit edge 50b tends to describe a deflection curve DC due to thermal deflection of edge 50b, caused by a temperature difference $\Delta T=T1-T2$ between the two glass sheets 3a, 3b. In the present example, the glass sheet 3a is subjected to a higher temperature T1 than the glass sheet 3b which is subjected to temperature T2. This causes the glass sheet 3a to expand more than glass sheet 3b. As the edge seal 11 of the VIG unit may provide a very rigid connection between the glass sheets, this causes the VIG unit 3 to thermally deflect, so that the edges of the glass sheets 3a, 3b moves in the same direction, and this temperature difference causes the edge 50b to describe a deflection curve DC that varies relative to the plane P1.

The outer, major surface S1 of the VIG unit 3 at and near the edge 50b, e.g. at the surface S1 opposite to the edge seal 3 thus obtains a convex shape when temperature T1 is higher than temperature T2 whereas the outer surface S2 of the other (lower) glass sheet 3b provides a concave shape due to the evacuated gap 4, thereby providing that both VIG unit glass sheets 3a, 3b thermally deflects/bends in the same direction.

As can be seen, the corners 51 of the VIG unit where the edge 8b terminates move in a direction D2 relative to the plane P1, whereas the centre portion 52 of the edge 50b, moves in the opposite direction D1 than the direction D2, relative to the plane P1. This is the case when the VIG unit is not fixed in the frame and is allowed to freely bend.

When/if the glass sheet 3b gets hotter than glass sheet 3a, caused by a temperature change of T1 and/or T2, the corners 51 of the VIG unit moves in the other direction D1 relative to the plane P1 and/or P2, and the centre portion 52 of the edge 50b, move in the direction D2, relative to the plane P1.

In one or more other embodiments of the present disclosure, the largest total edge deflection DIS4 of any of the edges 50a-50d of the vacuum insulated glass unit 3 at a temperature difference $\Delta T=T1-T2$ between the two glass sheets 3a, 3b of 65° C. as compared to the vacuum insulated glass unit at a temperature difference $\Delta T=T1-T2$ of 0° C. is at least 2 mm, such as at least 3 mm or at least 4 mm, such as in the range of 2 mm to 30 mm, preferably in the range of 3 mm to 20 mm. This is in an un-constricted state where the VIG unit is allowed to freely bend. These numbers with regarding to DIS4 may also apply for a laminated VIG unit in embodiments of the present disclosure. The numbers with regard to DIS4 may apply for a VIG unit having a surface area of the surfaces of above 0.9 m$^2$, such as at least 1.1 m$^2$, such as above 1.5 m$^2$. Here, it may be preferred that at least the longer edges 50a, 50b may be above 1 m in length.

In some embodiments, the total edge deflection DIS4 will be the sum of the largest distances of positions of the VIG unit edge in question from the plane P1 in each their direction D1, D2 from that plane. In FIG. 13, the largest total edge deflection DIS4 is defined between the deflection of the edge seal 11 at the centre 52 of the edge 50b, and the edge seal 11 at the corner 51 of the same edge, in a direction perpendicular to the plane P1.

FIG. 14 illustrates an example of a situation where a VIG unit 3 is subjected to a varying temperature difference $\Delta T=T1-T2$ between the glass sheets 3a, 3b over time, according to embodiments of the present disclosure.

For example, it is common for e.g. building aperture covers such as windows or doors arranged in openings of outer walls, roofs or the like of a building, that these are subjected to varying temperature differences over time after they have been installed. For example, with a general room temperature T1 of e.g. about 20° C. in the building, the temperature T2 at the other side (outside a building) of the VIG unit 3 may vary significantly, such as between e.g. 15° C. and 30° C. or even more, over 24 hours.

Even, the temperature difference $\Delta T=T1-T2$ may so to say switch "operational sign" so that the hotter side of the VIG unit 3 may shift one or more times over e.g. 24 hours, many times over a calendar year, or even in the case that a hail, rain or snow shower occurs for a short period of time. This may largely depend on the geographical area where the VIG unit frame assembly is installed, and causes the rate and even direction of the thermal deflection to change over time.

As an example over 24 hours, the outside temperature T2 may start to be 10° C. at 8 PM, and at 3 AM it may be 35° C., and it then gradually decreases again to 10° C. overnight. The inside temperature T1 is set to e.g. be 20° C. the whole 24 hours.

This causes the temperature difference $\Delta T$ to switch operational sign: The temperature T1 is 20° C. at the inside, and T2 (outside) is 10° C. at 8 PM. Thus, the VIG unit edge 50b corners 51 deflect in the direction D2 as illustrated in FIG. 13. Then the thermal deflection of the VIG unit edge 50b gradually changes (illustrated by dashed, envisaged deflection curves DC) as the temperature T2 changes to be 35° C. at 3 AM at surface 4b, and thus 15° C. higher than T1. Thus, the VIG unit thermal deflection changes so that the edges 5a0-50d deflects in the other direction, and then, it deflects back again as the temperature T2 changes back to the about 10° C. overnight. This may even vary over the year dependent on the time of year, and e.g. in winter time, the outside temperature may be significantly below 0° C., and in the summer time, it may be significantly above 30° C., although the inside room temperature may be desired to be substantially constant, e.g. by help from a room heating system or cooling system (e.g. air-conditioning). These systems may also be known as HVAC (Heating, ventilation, and/or air conditioning).

Even more extreme temperature conditions may appear in cases where the VIG unit is installed in a roof window.

Accordingly, the thermal deflection of the VIG unit 3 may vary significantly over 24 hours and even more over a longer period such as a calendar year and may depend on different weather conditions. This causes varying stress condition on the VIG unit over time, such as at the edges 50a-50d near the location where the VIG unit glass sheets are connected to seal the evacuated gap by e.g. an edge sealing 11. The stress conditions are complex. Examples of these stresses may be shear stresses at the VIG edge, differential stresses where tensile stress occurs at the deflecting glasses and/or stress concentrations at the corners.

The same may apply for doors of freezers and cooling furniture, e.g. when the cooling furniture is switched on or off, or due to opening and closing a door with a VIG unit therein.

The frame 2 may in embodiments of the present disclosure comprise a restriction arrangement for restricting the thermal deflection of the edge(s) 8a-8d, such as for example the longest edges 50a, 50b of the VIG unit or all edges of the VIG unit. This restriction arrangement may comprise a gasket solution, one or more stop parts or walls of the frame preventing an edge deflection above a certain point and/or the like. Additionally, it is understood that a bonding seal 15 at one side of the VIG unit may provide a sufficient restriction of the thermal edge deflection in embodiments of the present disclosure.

In some embodiments, the profile 6 as previously described and/or the bonding seal 9 may be configured to allow the edges of the VIG unit 3 to thermally deflect in response to a temperature difference $\Delta T=T1-T2$ between the glass sheets (3a, 3b) of the vacuum insulated glass unit as explained above.

For example, in one or more embodiments the largest edge deflection DIS4 (see FIG. 12) in a deflection direction of any of the edges of the vacuum insulated glass unit at a temperature difference between the two glass sheets of 65° C., as compared to the vacuum insulated glass unit at a temperature difference ($\Delta T$) of 0° C. may be at least 1 mm, such as in the range of 2 mm to 50 mm, preferably in the range of 1, 2 or 3 mm to 15 mm, more preferred in the range of 2 to 10 mm. This may be provided by that the connection member 6b and/or the fixation wall 6a is forced to deflect by the VIG unit edges due to the thermal deflection of the VIG unit edge. Also or alternatively, the bonding seal 9 may be compressed and/or stretched (dependent on the position along the edge) in response to a thermal deflection of the vacuum insulated glass unit caused by a temperature difference ($\Delta T$) between the glass sheets 3a, 3b of the vacuum insulated glass unit. This changes the thickness of the bonding seal 9 at one or more locations along the member 6a when compared to the thickness at the same one or more locations when the temperature difference $\Delta T$ is substantially 0° C.

According to embodiments of the present disclosure, the largest total edge deflection DIS4 of any of the edges 50a-50d of the vacuum insulated glass unit 3 at a temperature difference $\Delta T=T1-T2$ between the two glass sheets 3a, 3b of 65° C. as compared to the vacuum insulated glass unit 3 at a temperature difference between the glass sheets 3a, 3b of substantially 0° C. may be at least 0.3% of the length of the deflecting edge, such as in the range of 0.3% to 3.5% of the length of the deflecting edge, such as in the range of 0.4% to 2% of the length of the deflecting edge, such as in the range of 0.6% to 1.5% of the length of the deflecting edge. Additionally or alternatively, according to certain embodiments, the largest total edge deflection in said deflection direction of any of the edges of the vacuum insulated glass unit 3 at a to a temperature difference between the two glass 3a, 3b sheets of 40° C. as compared to the vacuum insulated glass unit at a temperature difference of 0° C. is at least 0.15% of the length of the deflecting edge, such as in the range of 0.15% to 3% of the length of the deflecting edge, such as in the range of 0.25% to 1.8% of the length of the deflecting edge, such as in the range of 0.35% to 1.2% of the length of the deflecting edge.

The frame 2/sash 17 may be configured to partly restrict a thermal deflection of the vacuum insulated glass unit 3 at the edges 50a-50d in response to a temperature difference $\Delta T$ between the glass sheets 3a, 3b of the vacuum insulated glass unit, when compared to a free, unrestricted thermal deflection of the vacuum insulated glass unit at substantially the same temperature difference $\Delta T$. For example, In one or more aspects of the present disclosure, the largest total edge deflection of the edges 50a-50d of the VIG unit 3 may be configured to be at least 10% smaller, such as at least 20% smaller, such as at least 30% smaller than the largest total edge deflection of the unrestricted vacuum insulated glass (VIG) unit at a temperature difference ($\Delta T=T1-T2$) of at least 40° C., such as about 65° C. This restriction may be provided by the bonding seal 9 and/or the profile 6, in combination with the overlapped structural member 8. These may together provide a clamping force onto the VIG unit, at least when the edge deflection exceeds a certain level, so that the more edge deflection, the more constriction of the thermal edge deflection of the VIG unit edges.

FIG. 15 illustrates an aperture covering 1 such as a window, for example a roof window. The aperture covering 1 substantially corresponds to the aperture covering described in relation to the previously described figures, see in particular FIGS. 5-11 and the description thereto. However, in FIG. 15, the VIG unit 3 is, in accordance with embodiments of the present disclosure, a laminated VIG unit 3 and accordingly it comprises a lamination glass sheet 70. The lamination glass sheet 70 may be a tempered, e.g. thermally tempered, glass sheet, or alternatively, it may be an annealed glass sheet, or generally a float glass sheet. This lamination glass sheet 70 is attached/bonded (by means of a lamination interlayer 71) to the outer surface of the VIG unit glass sheet 3b facing towards the interior and thus, away from the exterior surface S1 and the evacuated gap 4. Hence, the lamination glass sheet 70 provides the interior surface S1 of the VIG unit 3. The lamination interlayer 71 may be a PVB or EVA lamination material. The connection member 6a may be connected to the VIG unit by connecting it to the interior surface S2 of the lamination glass sheet, and/or by connecting it to the exterior surface S1 by a bonding seal 9. In the example of FIG. 15, the gasket 10 abuts the lamination glass sheet 70 and the lamination glass sheet 70 faces the interior and provides the interior surface S2.

Additionally, FIG. 15 illustrates a further embodiment of the present disclosure, where the overlapped, structural member 8 is not a solid elongated member made from e.g. wood, but instead it comprises insulation cavities 80. The insulating cavities 80 are separated by partition walls 81 of the structural member 8 which cavities 80 extends in the longitudinal direction LD of the elongated member 8, but such partition walls 81 may also in further embodiments be omitted.

The structural elongated, structural member 8 may in particular when having insulating cavities 80, comprise a polymer material such as a plastic material, e.g. PVC and/or a fibre-reinforced material such as a glass fibre or carbon fibre reinforced material. In such cases, the overlapped structural member may be manufactured by means of pultrusion and/or extrusion, such as e.g. co-extrusion.

The partition walls 81 and/or the outer walls of the structural member 8 may in further embodiments of the present disclosure comprise one or more strengthening elongated members (not illustrated) embedded in the walls or attached to the walls, in order to provide a structural member 8 with increased inherent rigidity. These strengthening members may be co extruded and/or pultruded with the walls. The strengthening members may e.g. be made from a material such as carbon fibre or glass fibre, it may e.g. be carbon or glass fibre rods or wires, it may be a metal such as steel or aluminium rods or plates, or it may be a rigid polymer, such as fibre reinforced polymer material.

The insulating cavities 80 may comprise air in embodiments of the present disclosure, or it may be hermetically sealed cavities containing an insulation medium such as an insulating gas. Alternatively, the cavities 80 may be filled with an insulating material, such as a rigid or resilient insulating material, for example an insulating foam, a polystyrene material and/or a glass fibre insulation such as glass or mineral wool.

In other embodiments of the present disclosure, the structural member 8 may be made from or comprise a wood material, e.g. a softer wood material such as pine wood or harder wood such as oak, beech, mahogany or the like. The wood may be laminated.

In further embodiments of the present disclosure (not illustrated), the structural member may comprise aluminium such as aluminium shells joined by thermal breaks.

FIG. 16 illustrates a cross sectional view through an aperture cover such as a window according to embodiments of the present disclosure. Here the difference between the total width TWsa of the sash 17, and the total width TWfr of the fixation frame 12 is less than ±15%, such as less than ±8%, for example less than ±5% of the total width of the fixation frame 12. In certain embodiments of the present disclosure, the difference between the total width TWsa of the sash 17, and the total width TWfr of the fixation frame 12 is less than ±2% or less than ±1% of the total width of the fixation frame 12 and in the present example of FIG. 16, TWsa is substantially equal to TWfr.

The same may additionally or alternatively apply for the total height of the frame and the total height of the sash respectively.

Generally, the difference between the total width TWvig of the VIG unit, and the total width TWfr of the fixation frame 12 may in embodiments of the present disclosure be less than ±15%, such as less than ±8%, such as less than ±5% of the total width TWfr of the fixation frame 12. In the present example, Tvig is substantially equal to TWfr. In certain embodiments of the present disclosure, the difference between the total width TWvig of the VIG unit, and the total width TWfr of the fixation frame ±12 is less than ±2% or less than ±1% of the total width of the VIG unit. The same may apply for the total height of the frame and the VIG unit respectively.

For example, if the total height of the frame is 120 cm, the VIG unit height may, with a 1% max height difference have a total height between approx. 119 and 121 cm.

The difference between total height and/or total width of the VIG unit and total height and/or width of the fixation frame may in aspects of the present disclosure be between 0 and 5 cm such as between 0 and 3 cm, for example between 0 and 1 cm or between 0 and 0.5 cm.

The difference between total height (THvig) and/or total width (TWvig) of the VIG unit and total height and/or width (TWfr) of the fixation frame 12 may in aspects of the present disclosure be between 0 and 5 cm such as between 0 and 3 cm, for example between 0 and 1 cm or between 0 and 0.5 cm.

In embodiments of the present disclosure, the difference between the total area (total width×total height) described by the total width and total height of the fixation frame 12 and the sash 17 respectively, may be less than ±8%, such as less than ±5%. In certain embodiments of the present disclosure, the difference between the total area (total length×total height) described by the total width and total height of the fixation frame 12 and the sash 17 respectively may be less than ±2% or less than ±1% of the total area of the fixation frame (12).

For example a 1 m×1.2 m frame provides a 1.2 m² total frame area. This provides a total area of the sash (with a ±2% total area tolerance), that may be within:

1.2×0.98 to 1.2×1.02=approximately 1.18 m² to 1.22 m².

The total area of the fixation frame and the total area of the VIG unit and/or sash may in embodiments of the present disclosure be substantially the same.

FIG. 17 illustrates an embodiment of the resent disclosure, wherein the frame 2 comprises two gaskets 19, 24 (but more may be present in further embodiments) for abutting to the overlapped elongated structural member 8 of the sash 17 when the sash 17 is closed. The gasket 19 is placed closest to the frame opening 2a. the second gasket 24 is placed further in the space 15 at an elevated surface part 26 of the fixation frame 12, which is elevated or placed at another level when compared to the surface part 27 on which the gasket 19 is arranged. One or both gaskets 19, 24 may e.g. be resilient rubber gaskets or foam gaskets that are compressed or deflected by the sash when the sash is placed in a closed position. It is generally understood that one or both of the gaskets 19, 24 may be attached to the sash 17 instead of the fixation frame 12.

FIG. 17 also illustrates that the angle of the outer surface 14 of the member 8 may be inclining relative to the surface S2 of the VIG unit, and in the present case, this calls for an obtuse angle between the walls 6a, 6b of the connection profile 6.

FIG. 18 illustrates a visualized computer simulation of a "free" thermal deflection of a VIG unit 3 used for a frame 2 according to embodiments of the present disclosure, which has been provided by one of the present inventors. The VIG unit 3 simulated was based on a VIG unit model defined to have the following characteristics:

The VIG unit is laminated and hence comprises a lamination glass and a lamination interlayer Length L1 of shorter edges 50c 50d: 114 cm Length of the longer edges 50a, 50b: 140 cm Glass sheets 3a, 3b Thermally tempered glass sheets each having a thickness of 4 mm.

Lamination glass: annealed float glass of a thickness of 4 mm

Edge seal 11 material: solder glass edge seal material

The VIG is arranged with the surfaces S1, S2 horizontally (when the temperature difference ΔT=T1−T2 is 0° C.) and is thus simulated so that gravity acts on the VIG unit.

Temperature difference between T1 and T2: about 60° C.

The hotter side (S2) was set to be the lamination glass side and hence the lamination glass sheet provides the outer major surface S2 in FIG. 18.

For the computer simulation model, a temperature difference/gradient profile was established in accordance with temperatures measured across the hotter/heated side. This profile was based on temperature measurements provided during the test described below. This profile was used in the simulation model for the hotter side. The lamination interlayer was a PVB material.

Under these conditions, the simulation results defined that the distance DIS4 from the centre part 52 of the longer edge 50b would be 7.82 mm from the plane P1 (DIS4).

Moreover, under these conditions, the simulation results defined that the distance DIS4 from the centre part 52 of the shorter edge 50c would be 5.15 mm from the plane P1.

FIGS. 19 and 20 are images of a test of a thermal deflection of a laminated VIG unit 3 having substantially the parameters as defined above with regard to FIG. 18. The VIG unit 3 was placed horizontally to support on support surfaces 61a of a plurality of support rods 61 of a support frame 60. The VIG unit 3 supported initially, when the temperature difference ΔT=T1−T2 was substantially 0° C., on substantially all support surfaces of the frame 62 on which the VIG unit was arranged.

An infrared heat radiation arrangement 63 was arranged above the upper glass sheet, i.e. the lamination glass sheet, and covered the upper glass sheet to a bit beyond the side surfaces 7 of the VIG unit 3. Then the heating arrangement 63 started to heat the upper glass sheet 70 of the VIG unit 3, so that the upper glass sheet reached a maximum temperature of approx. 100° C., and the lower glass was measured to have a temperature of approximately 35° C. It was expected and validated that the temperature of the heated glass facing the radiation heater varied over the surface due to cold bridges caused by among others the edge seal of the VIG unit. Hence, no completely uniform heating was obtained (as opposed to the simulation results), but the maximum temperature measured at the heated glass sheet was about 100° C., and for the majority of the heated surface, the temperature was determined to be above at least 85° C. and at many locations above 90° C.

The present inventors could after the heating by the infrared heating arrangement visually see and confirm a formation of an edge deflection curve DC between the VIG unit corners 51. This provided a maximum edge deflection DIS4 of the VIG unit due to the forced temperature difference $\Delta T=T1-T2$, when compared to the temperature difference $\Delta T=T1-T2$ of substantially 0° C. The distance DIS4 was determined by a first reference point defined by a support surface 61*a* (that was used as a reference for the plane P1), and the lower surface of the VIG unit 3, in a direction substantially perpendicular to the plane P1.

The maximum edge deflection DIS4 of the long edge 50*b* (FIG. 19) was measured to be approximately 7.4, or more precisely 7.43 mm at the forced temperature difference, when compared to the temperature difference $\Delta T=T1-T2$ of substantially 0° C.

FIG. 20 illustrates the edge deflection of the shorter edge 50*c* of the same VIG unit as tested in FIG. 15. Here, in a similar way, the shorter edge 50*c* described an edge deflection curve DC due to the forced heating and the temperature difference between T1 and T2. Additionally, the maximum edge deflection DIS4 of the edge 5*b* was measured to be approximately 5.3, or more precisely 5.33 mm, at the forced temperature difference, when compared to the temperature difference $\Delta T=T1-T2$ of substantially 0° C.

Accordingly the maximum tested edge deflection DIS4 vs the simulated edge deflection resulted in the values of table 1 below.

TABLE 1

| | Simulated edge deflection DIS4 | Edge deflection test (FIGS. 19-20) DIS4 |
|---|---|---|
| Longer edge 50b | 7.82 mm | 7.43 mm |
| Shorter edge 50c | 5.15 mm | 5.33 mm |

The inventors concluded that the test illustrated in FIGS. 19-20 validated the computer simulations, and thus confirmed that the VIG unit computer simulations was sufficiently precise and reliable.

Additionally, the test approved that the edges of larger size laminated VIG units having rigid edge seals 11 provided by fused edge seal material such as solder glass or a metal solder, when subjected to a larger temperature difference, will tend to provide/describe an edge deflection curve DC (see e.g. FIGS. 12-14) that causes a substantial edge deflection DIS4 in an un-constricted situation where no "outer" mechanical forces constrains the edge deflection. This applies in laminated VIG units and VIG units which are not laminated.

The above disclosure is generally described as relating to a building aperture cover in the form of architectural aperture coverings, more particular in the form of window solutions. It is generally understood that these window solutions may e.g. be for vertical windows where the VIG unit is arranged with a plane P1 arranged with an angle of substantially 90° compared to horizontal. In further aspects of the present disclosure, the window is a roof window where the VIG unit 3 is arranged with an angle different from vertical, for example where the plane P1 is arranged with an angle between 5° and 90°, such as between 10° and 75° or 5° and 85°, compared to horizontal. It is however understood that the solutions disclosed above may also be used in architectural aperture coverings in the form of doors comprising windows.

In further embodiments of the present disclosure, the VIG unit frame 2 solutions disclosed in this document may be used as architectural aperture coverings in or as curtain walls.

In still further embodiments of the present disclosure, the VIG unit frame 2 solutions disclosed in this document may be aperture coverings in the form of gates/doors and/or walls of cooling appliances such as freezers or refrigerators, for example of refrigerators for storing food for human consumption at a temperature below 7° C. such as below 5° C., e.g. below 0° C., or below −10° C., such as between −5° C. and −30° C. Here the content such as goods placed inside the cooling appliances will be visible from the exterior of the cooling appliances by looking through the VIG unit 3.

While the present disclosure has been described in detail in connection with only a limited number of embodiments or aspects, it should be readily understood that the present disclosure is not limited to such disclosed embodiments or aspects. Rather, the present disclosure can be modified to incorporate any number of variations, alterations, substitutions or equivalent arrangements not heretofore described, but which are commensurate in scope with the present disclosure. Additionally, while various embodiments or aspects of the present disclosure have been described, it is to be understood that aspects of the present disclosure may include only some of the described embodiments or aspects or combinations of the various embodiments or aspects. Accordingly, the present disclosure is not to be seen as limited by the foregoing description.

The invention claimed is:

1. An aperture cover, comprising:
    a vacuum insulated glass unit comprising a first glass sheet and a second glass sheet, wherein an evacuated gap is placed between the first and second glass sheets, wherein a plurality of support structures are distributed in the evacuated gap, and wherein an edge seal encloses the evacuated gap, wherein the vacuum insulated glass unit comprises outer major surfaces and side surfaces,
    a frame, wherein the frame comprises elongated structural frame members which together encloses a frame opening,
    wherein the elongated structural frame members comprises an inner side surface facing the frame opening, and an opposing outer side surface,
    wherein the vacuum insulated glass unit overlaps at least one of said elongated structural frame members so that an edge surface of the vacuum insulated glass unit extends beyond the outer side surface of the overlapped elongated structural frame member,
    wherein the frame comprises an elongated connection profile comprising a connection wall member which extends parallel to the overlapped structural frame member and is connected to at least one of said outer major surfaces of the vacuum insulated glass unit,
    wherein the elongated connection profile comprises a fixation member which is connected to the overlapped structural frame member, and wherein the evacuated gap overlaps the elongated structural member with a distance;
wherein the connection wall member is connected to the outer major surface of the vacuum insulated glass unit by means of a bonding seal; and
wherein the bonding seal is a structural adhesive, wherein said bonding seal has a thickness above 4 mm at a temperature difference between the two glass sheets of the vacuum insulated glass unit of substantially 0° C., wherein said bonding seal is configured to be compressed and/or stretched in response to a thermal deflection of the vacuum insulated glass unit caused by a temperature difference between the glass sheets of the vacuum insulated glass unit, thereby changing the thickness of the bonding seal at one or more locations along the connection wall member when compared to the thickness at the same one or more locations when the temperature difference is substantially 0° C.

2. An aperture cover according to claim 1, wherein said connection wall member covers and is attached to a part of at least one of the outer major surfaces of the vacuum insulated glass unit which extends beyond the outer side surface of the overlapped structural frame member.

3. An aperture cover according to claim 1, wherein the connection wall member extends over a surface part of a fixation frame.

4. An aperture cover according to claim 1, wherein the fixation member is connected to the overlapped structural frame member from an outer side of the overlapped structural frame member, wherein the fixation member abuts the opposing outer side surface of the overlapped structural frame member, wherein the fixation member is an elongated fixation wall which is aligned with a part of the opposing outer side surface of the overlapped structural frame member.

5. An aperture cover according to claim 1, wherein the elongated connection profile is a metal profile.

6. An aperture cover according to claim 1, wherein the connection wall member and the fixation member together provides an angle bracket shape, when seen in a plane which is perpendicular to the longitudinal direction of the elongated connection profile.

7. An aperture cover according to claim 1, wherein the fixation member is releasably fixed to the elongated, structural member by means of one or a plurality of mechanical fasteners.

8. An aperture cover according to claim 1, wherein the aperture cover is a window, wherein the vacuum insulated glass unit is a laminated vacuum insulated glass unit comprising a further glass sheet bonded to a major surface of the vacuum insulated glass unit by means of a lamination interlayer.

9. An aperture cover according to claim 1, wherein said frame is a sash which is movably connected to a fixation frame by means of one or more hinge connections, wherein the sash comprises at least the overlapped structural member and the connection profile.

10. An aperture cover according to claim 9, wherein a difference between a total area of the fixation frame and a total area of the sash, respectively, is less than ±8% of the total area of the fixation frame, where the total area of the fixation frame is defined by a total width multiplied with a total height of the fixation frame, and where a total area of the sash is defined by a total width multiplied with a total height of the sash.

11. An aperture cover according to claim 1, wherein said edge seal of the vacuum insulated glass unit is a fused edge seal, wherein the Uc-value of the vacuum insulted glass unit is below 0.7 W/(m²K), wherein said bonding seal and/or said elongated connection profile is/are configured to allow edges of the vacuum insulated glass unit to thermally deflect in response to a temperature difference between the glass sheets of the vacuum insulated glass unit.

12. An aperture covering according to claim 1, wherein a gasket strip is arranged between the elongated structural member and an interior major surface, wherein the gasket strip has a thickness between 4 mm and 30 mm at a temperature difference between the two glass sheets of substantially 0° C., and wherein said thickness is measured in a direction perpendicular to the interior major surface, and wherein a minimum distance between at least one of the outer major surfaces of the vacuum insulated glass unit and walls of said elongated structural frame members is at least 4 mm at a temperature difference between the two glass sheets of the vacuum insulated glass unit of substantially 0° C.

13. An aperture cover according to claim 1, wherein said connection profile comprises a protection wall which extends to and covers the edge surface of the vacuum insulated glass unit.

14. An aperture covering according to claim 1, wherein the evacuated gap overlaps the elongated structural member by between 50% to 100% of a maximum width, of the overlapped structural member.

15. An aperture covering according to claim 1, wherein the evacuated gap overlaps an entire width of the elongated structural member, and extends beyond the outer side surface of the overlapped structural member.

16. An aperture cover according to claim 1, wherein said elongated connection profile, is configured to be flexed in response to a thermal deflection of the vacuum insulated glass unit caused by a temperature difference between the glass sheets of the vacuum insulated glass unit.

17. An aperture cover according to claim 1, wherein a distance from an outer edge surface of the vacuum insulated glass unit and to a location where the vacuum insulated glass unit starts to overlap the elongated structural frame member is at least 25 mm.

18. A building aperture cover arrangement comprising two or more aperture covers according to claim 1, wherein said aperture covers are windows, and wherein the windows are arranged next to each other so that side surfaces of the vacuum insulated glass unit are arranged substantially opposite to each other, wherein a mutual distance is provided between opposing edge surfaces of the vacuum insulated glass units of the windows arranged next to each other, wherein said mutual distance is less than 12 cm.

* * * * *